(12) United States Patent
Iwema et al.

(10) Patent No.: US 7,137,076 B2
(45) Date of Patent: Nov. 14, 2006

(54) CORRECTING RECOGNITION RESULTS ASSOCIATED WITH USER INPUT

(75) Inventors: Marieke Iwema, Seattle, WA (US); Leroy B. Keely, Portola Valley, CA (US); Charlton E. Lui, Redmond, WA (US); Kevin P. Paulson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 683 days.

(21) Appl. No.: 10/207,133

(22) Filed: Jul. 30, 2002

(65) Prior Publication Data

US 2004/0021700 A1 Feb. 5, 2004

(51) Int. Cl.
G06F 3/00 (2006.01)
G06F 3/048 (2006.01)

(52) U.S. Cl. .................... 715/863; 345/179
(58) Field of Classification Search ............. 382/187; 715/863
See application file for complete search history.

(56) References Cited

U.S. PATENT DOCUMENTS

| | | | |
|---|---|---|---|
| 4,829,576 A | 5/1989 | Porter | |
| 4,866,778 A | 9/1989 | Baker | |
| 5,331,431 A | 7/1994 | Jasinski et al. | |
| 5,406,480 A | 4/1995 | Kanno | |
| 5,502,774 A | 3/1996 | Bellegarda et al. | |
| 5,513,278 A | 4/1996 | Hashizume et al. | |
| 5,517,578 A | 5/1996 | Altman et al. | |
| 5,550,930 A * | 8/1996 | Berman et al. ............. | 382/187 |
| 5,583,543 A * | 12/1996 | Takahashi et al. .......... | 345/173 |
| 5,590,257 A | 12/1996 | Forcier | |
| 5,596,694 A | 1/1997 | Capps | |
| 5,615,378 A | 3/1997 | Nishino et al. | |
| 5,649,027 A * | 7/1997 | Mahajan et al. ............ | 382/185 |
| 5,659,771 A * | 8/1997 | Golding ...................... | 715/533 |
| 5,666,139 A * | 9/1997 | Thielens et al. ............ | 345/173 |
| 5,682,439 A * | 10/1997 | Beernink et al. ........... | 382/187 |
| 5,710,916 A * | 1/1998 | Barbara et al. ................ | 707/9 |
| 5,715,469 A | 2/1998 | Arning | |
| 5,717,939 A * | 2/1998 | Bricklin et al. ............. | 715/503 |
| 5,764,799 A * | 6/1998 | Hong et al. ................. | 382/225 |
| 5,787,455 A | 7/1998 | Seybold | |
| 5,802,388 A | 9/1998 | Zetts et al. | |
| 5,812,697 A * | 9/1998 | Sakai et al. ................. | 382/186 |
| 5,841,901 A * | 11/1998 | Arai et al. ................... | 382/187 |

(Continued)

FOREIGN PATENT DOCUMENTS

EP 1 363 232 A2 11/2003

(Continued)

OTHER PUBLICATIONS

Ward, Jean et al "An Annotated Bibliography in Pen Computing and Handwriting Character Recognition" 1992.*

(Continued)

Primary Examiner—Weilun Lo
Assistant Examiner—Steven Theriault
(74) Attorney, Agent, or Firm—Banner & Witcoff, LTD

(57) ABSTRACT

Recognition results associated with handwritten electronic ink, voice recognition results or other forms of user input can be corrected by designating at least a portion of a visual display. Recognition results corresponding to the designated portion, and optionally, additional recognition results to provide context, are displayed. Portions of the displayed recognition results are then selected, and alternate recognition results made available. Alternate recognition results can be chosen, and the selected recognition results modified based upon the chosen alternate. The invention may include different user interfaces.

8 Claims, 26 Drawing Sheets

U.S. PATENT DOCUMENTS

| | | | |
|---|---|---|---|
| 5,850,480 A * | 12/1998 | Scanlon | 382/229 |
| 5,855,000 A | 12/1998 | Waibel et al. | |
| 5,870,702 A * | 2/1999 | Yamabana | 704/10 |
| 5,883,986 A * | 3/1999 | Kopec et al. | 382/310 |
| 5,907,839 A | 5/1999 | Roth | |
| 5,956,739 A | 9/1999 | Golding et al. | |
| 5,960,447 A | 9/1999 | Holt et al. | |
| 5,966,464 A * | 10/1999 | Kojima | 382/228 |
| 6,005,973 A * | 12/1999 | Seybold et al. | 382/187 |
| 6,014,460 A * | 1/2000 | Fukushima et al. | 382/177 |
| 6,052,482 A * | 4/2000 | Arai et al. | 382/187 |
| 6,055,333 A * | 4/2000 | Guzik et al. | 382/187 |
| 6,108,445 A * | 8/2000 | Uehara | 382/189 |
| 6,111,985 A * | 8/2000 | Hullender et al. | 382/229 |
| 6,154,579 A | 11/2000 | Goldberg | |
| 6,167,376 A | 12/2000 | Ditzik | |
| 6,185,333 B1 * | 2/2001 | Arai et al. | 382/187 |
| 6,205,261 B1 | 3/2001 | Goldberg | |
| 6,285,785 B1 | 9/2001 | Bellegarda et al. | |
| 6,337,698 B1 | 1/2002 | Keely, Jr. et al. | |
| 6,340,967 B1 | 1/2002 | Maxted | |
| 6,424,743 B1 | 7/2002 | Ebrahimi | |
| 6,438,523 B1 | 8/2002 | Obertcuffer et al. | |
| 6,473,517 B1 * | 10/2002 | Tyan et al. | 382/105 |
| 6,513,005 B1 | 1/2003 | Qin et al. | |
| 6,583,798 B1 | 6/2003 | Hoek et al. | |
| 6,618,697 B1 | 9/2003 | Kantrowitz et al. | |
| 6,701,023 B1 | 3/2004 | Gaither et al. | |
| 6,714,214 B1 | 3/2004 | DeMello et al. | |
| 6,735,341 B1 | 5/2004 | Horie et al. | |
| 6,782,510 B1 | 8/2004 | Gross et al. | |
| 6,788,815 B1 * | 9/2004 | Lui et al. | 382/187 |
| 6,847,734 B1 | 1/2005 | Hamamura | |
| 6,904,405 B1 | 6/2005 | Suominen | |
| 6,912,498 B1 * | 6/2005 | Stevens et al. | 704/235 |
| 2002/0180689 A1 | 12/2002 | Venolia | |
| 2002/0194223 A1 | 12/2002 | Meyers et al. | |
| 2003/0007018 A1 | 1/2003 | Seni et al. | |
| 2003/0014252 A1 | 1/2003 | Shizuka et al. | |
| 2003/0016873 A1 | 1/2003 | Nagel et al. | |
| 2003/0189603 A1 | 10/2003 | Goyal et al. | |
| 2005/0128181 A1 | 6/2005 | Wang et al. | |
| 2005/0135678 A1 | 6/2005 | Wecker et al. | |

FOREIGN PATENT DOCUMENTS

| | | | |
|---|---|---|---|
| EP | 1363229 A2 | 11/2003 | |
| EP | 1365349 A2 | 11/2003 | |
| JP | 63095590 | 4/1988 | |
| JP | 04290184 | 10/1992 | |

OTHER PUBLICATIONS

Bill Camarda, Using Microsoft Word 97, 1997, Que Corporation, pp. 54-55 and 199-200.

U.S. Appl. No. 10/145,425, filed May 13, 2002, Soin et al.

U.S. Appl. No. 10/174,491, filed Jun. 17, 2002, Garside et al.

Hirokazu Bandoh, "User Interfaces for Correcting Errors in Writing-box-free Recognition of Handwritten Text," IPS Japan, vol. 43, No. 6, pp. 1996-2005 (Jun. 2002).

Nicholas Baran, "Rough Gems: First Pen Systems Show Promise, Lack Refinement," Byte, pp. 212-222 (Apr. 1992).

Michael A. Grasso, "The Integrality of Speech In Multimodal Interfaces," ACM Transactions on Computer Human Interaction, vol. 5, No. 4, pp. 303-325 (Dec. 1998).

Karen Kukich, "Techniques for Automatically Correcting Words in Text," ACM Computer Surveys, vol. 24, No. 4, pp. 377-439 (Dec. 1992).

C.G. Leedham, "Historical Perspectives of Handwriting Recognition Systems," The Institution Electrical Engineers, (1994).

Bernhard Suhm et al., "Model-based and Empirical Evaluation of Multimodal Interactive Error Correction," CHI, Pittsburgh, PA, pp. 584-591 (May 15-20, 1999).

Bernhard Suhm et al., "Multimodal Error Correction for Speech User Interfaces," ACM Transactions on Computer Human Interaction, vol. 8, No. 1, pp. 60-98 (Mar. 2001).

R. Zhao, "Pen-based Interfaces in Engineering Environments," Symbiosis of Human and Artifact, Elsevier Science B.V. pp. 531-535 (1995).

Wolfgang Hürst et al., "Error Repair in Human Handwriting—An Intelligent User Interface for Automatic On-Line Handwriting Recognition," IEEE Joint Symposia on Intelligence and Systems, pp. 389-395 (1998).

Ivan Poupyrev et al., "Virtual Notepad: Handwriting in Immersive VR," IEEE Virtual Reality Annual International Symposium, Mar. 14-18, 1998, pp. 126-132.

L. Schomaker, "From Handwriting Analysis to Pen-Computer Applications," Electronics and Communication Engineering Journal, vol. 10, No. 3, pp. 98-102 (1998).

OCR Master User's Guide, published by Microforum, 1997, pp. 3-6, 3-7, 3-14, 3-15, and 5-2-5-5.

* cited by examiner

301

*this is an example of an ink recognition + correction ui for a non-specific application*

FIG. 3A

301' thesis un example of un-ink recognition and correction you I four a nonspecific application

FIG. 3B

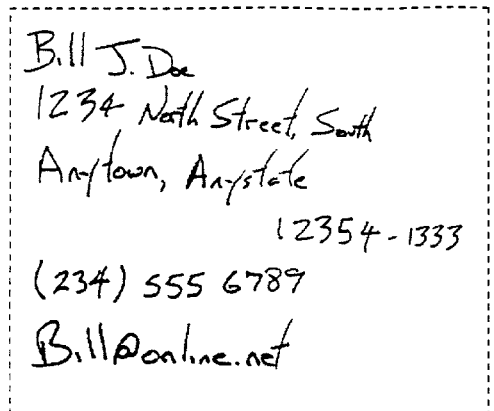
FIG. 9A
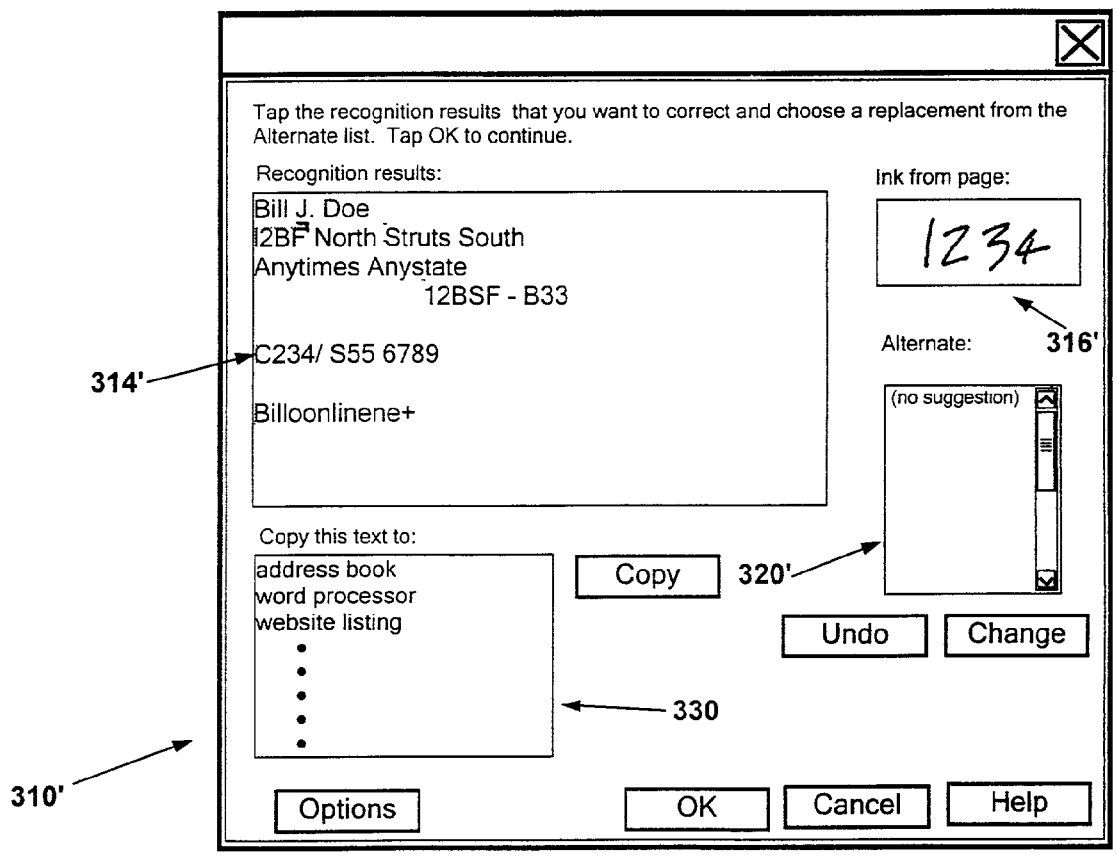

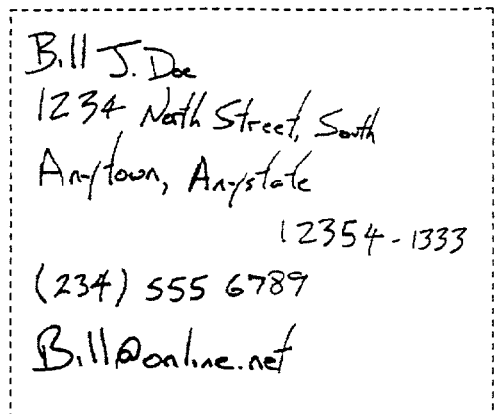
FIG. 9B
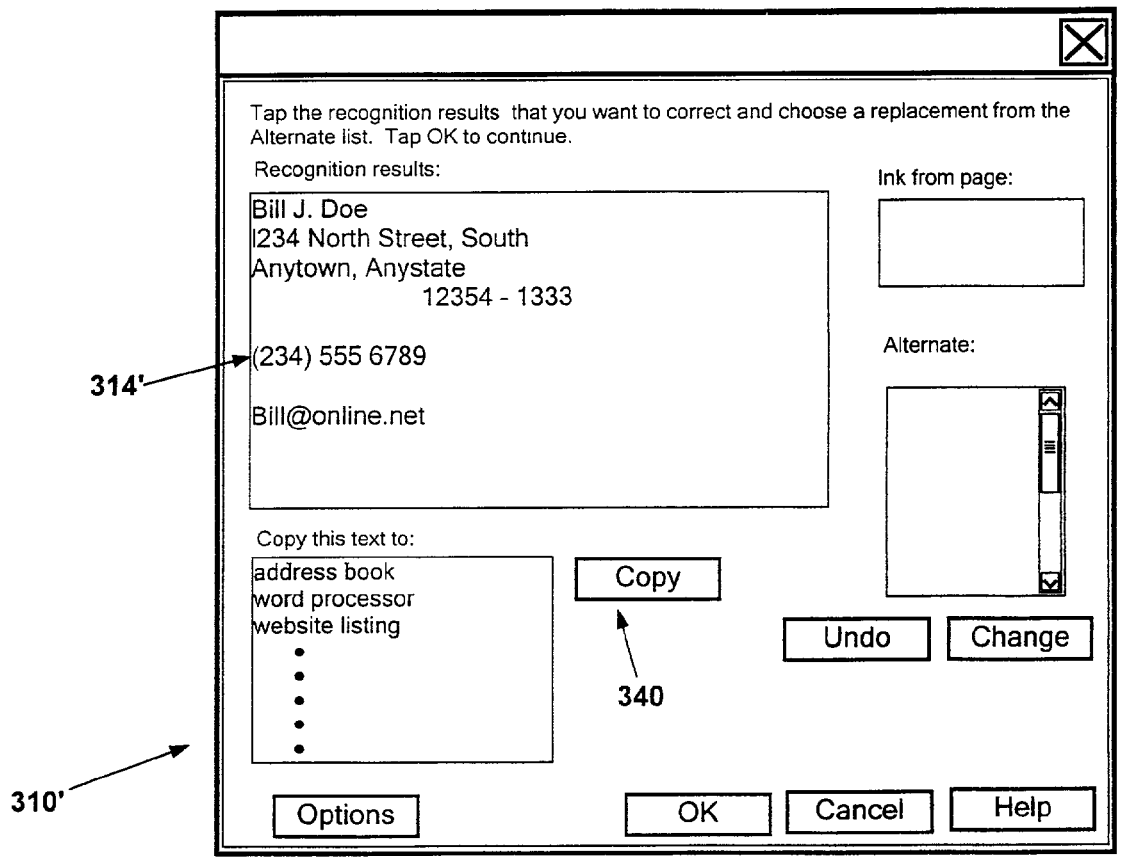

410

CORRECTING RECOGNITION RESULTS ASSOCIATED WITH USER INPUT

FIELD OF THE INVENTION

This invention relates to correction of recognition results generated by a computer based upon input by a user into a computer or other electronic device. In particular, this invention relates to methods, systems and user interfaces for modifying text or other objects that have been generated by recognition software with regard to electronic ink or user speech.

BACKGROUND OF THE INVENTION

Computers (including lesser electronic devices with limited computational abilities) are now part of everyday life. Until recently, however, the tasks for which computers could practically be used was sometimes limited by the manner in which a user could input information. There are innumerable ways in which pre-existing text, graphics, numerical data or other information can be transferred to the memory or storage of a computer. For example, a picture or other graphic can be scanned and transmitted electronically to (and between) computers. Text files can similarly be uploaded, downloaded, etc., as can many other types of information that someone else has previously assembled, tabulated, typed, etc.

However, there are fewer options for input of information being contemporaneously created. In many ways, the keyboard is still the primary computer input mechanism in this regard. Although keyboard text entry is satisfactory (or even superior) in some circumstances, it is less satisfactory in other circumstances. Note taking is but one example. Many individuals lack the typing skills to contemporaneously take notes by typing on a keyboard. Even if a person has such skills, he or she may find it socially awkward or otherwise inappropriate to simultaneously use a keyboard and devote attention to other matters, such as participation in a meeting. Conversely, most people can take handwritten notes while participating in such activities, and can do so rather quickly. Many people also take notes by combining written language with drawings, sketches, diagrams, symbols, etc. Keyboards, mice, touchpads, trackballs and various other traditional user input devices are not conducive to such activity. Moreover, keyboards often require using both hands to type and generally require a surface upon which to rest the keyboard, and are thus ill-suited to situations where a user may be standing or frequently moving from place to place. For these and other reasons, a computer sometimes cannot practically be used in a situation where the computational, storage and other abilities of the computer might be beneficial.

An increasingly common input technique mimics traditional pencil (or pen) and paper. Specifically, certain devices allow a user to create images by moving an electromagnetic pen or other stylus across a display screen. Using the stylus as a writing instrument, the user creates a graphical image of handwriting, symbols, drawing figures, or anything else that can be drawn with pencil and paper. Various application software may then be able to recognize or interpret the electronically handwritten letters, words, symbols, drawing figures, etc. Text or other types of objects may then be associated with (or substituted for) the electronic "ink." Alternatively (or additionally), the associated text or other object type may be communicated to another application program. These devices and associated recognition software offer the convenience and intuitive nature of pencil and paper combined with electronic storage, editing, copying and other advantages of a computer.

Unfortunately, these advantages can be offset by the inherent inaccuracies of present recognition software. Almost inevitably, some text (or other object type) automatically associated by such software with electronic ink handwriting is not correct and must be replaced by other text (or object type). Some handwriting may not be recognized at all, or other types of corrections may be needed (e.g., replacing only a few characters of a word, changing case, underlining, changing color or other display attributes, changing volume, etc.). Accordingly, any system using electronic ink must include the ability to make corrections. If correction methods and interfaces are not intuitive, efficient and comfortable, the advantages over other input mechanisms—or even over pencil and paper—can quickly erode. Accordingly, there is a need for improved methods and interfaces for correcting recognition results corresponding to electronic ink.

Speech (or voice) recognition is another input mechanism that is often more advantageous than a keyboard or other input devices. Various software applications can convert (with varying degrees of accuracy) spoken words into electronically stored and/or displayed text. Even when speech recognition might be advantageously used, however, recognition results usually require some amount of user correction and/or modification. Without convenient and user-friendly ways of making such corrections, any advantage from voice recognition may be undercut. Accordingly, there is also a need for improved methods and interfaces for correcting recognition results that correspond to information input by speech recognition techniques.

SUMMARY

Aspects of the present invention provide methods for correcting recognition results associated with handwritten electronic ink, spoken words, or other user input. The methods are more intuitive, efficient, comfortable and otherwise advantageous than existing methods. In the case of ink, some aspects of the invention allow designation of ink for correction, and then display of recognition results associated with the designated ink. The recognition results may be text, graphics, or other object types. In the case of words spoken by a user, text or other recognition results corresponding to the spoken words may be visually presented to a user, and the user able to designate some or all of the recognition results for correction. In either case, a selection of at least one recognition result is made, and various alternate recognition results may be suggested. If one of the alternates is chosen, the selected recognition result may then be modified based upon the chosen alternate; the modification could include replacement of the chosen alternate recognition result for the selected recognition result. This information can be used again if the same word or words are recognized; the recognition engine can effectively learn from the correction and apply the correction to future recognitions. Recognition results can be shown for single words or for multiple words. The recognition engine can use information from the word combination, sentence construction or other word grouping to increase recognition accuracy.

Some aspects of the invention may be implemented with varying user interfaces, including but not limited to dialog-based interfaces and on-object correction interfaces. Additional aspects may include spell-checking, grammar-checking, and subject-specific recognition. Additional advantages and features of the invention are set forth in the detailed description, or will be apparent to persons skilled in the art in light of that description.

BRIEF DESCRIPTION OF THE DRAWINGS

The foregoing summary is better understood when read in conjunction with the accompanying drawings, which are included by way of example, and not by way of limitation with regard to the claimed invention.

FIG. 3A is an example of electronic ink handwriting.

FIG. 3B is an example of a display of text associated with user speech by recognition software.

FIG. 9A shows another example of a user interface for correcting electronic ink handwriting in accordance with aspects of the invention.

FIG. 9B shows the user interface of FIG. 9A after selecting a subject matter.

DETAILED DESCRIPTION

This invention relates to methods, systems and user interfaces for modifying or replacing recognition results that correspond to user input in forms such as handwritten electronic ink or speech. The following description is divided into various subsections: Definitions; Exemplary Operating Environment; Correcting Text Associated with Ink or Speech; Correcting Non-Text Objects; Additional Aspects; Alternate Embodiment; Further Aspects; and Conclusion. These subsections are for the reader's convenience and not intended as limitations upon the invention.

Definitions

Unless otherwise indicated, various terms as used in this specification and in the claims have the following meanings:

Text: Letters, words, sentences, paragraphs, etc. having characters that can be represented by unique codes (e.g., ASCII, Unicode, etc.). Text also includes non-letter characters and symbols.

Electronic Ink (or Ink): A sequence or set of points, displayed or displayable on a CRT, LCD, or other display device, which were created by moving a stylus, mouse or other input device so as to mimic pencil and paper or other types of non-electronic writing or drawing. The electronic ink may include additional properties and methods resulting in a rich representation of the ink. Also, the ink may be stored as an ink object which may include properties and/or methods.

Recognize or interpret: To perform one or more software programs, routines or other processes with regard to electronic ink or speech so as to determine what textual character(s) or other information is intended to be represented. A recognition result is the product of the recognition programs, routines or processes, and may include text, graphics, ink or other object type.

Object: As commonly used in the art, an object includes combinations of computer code and data used to represent quantities or concepts with which a user can interact. An object may have variables that can have values, and may also have associated procedures, methods and other functions.

Stylus: As used herein, stylus includes all types of implements that may be used for interaction with a digitizing device, as is described below with regard to the exemplary operating environment.

Exemplary Operating Environment

Figure 1:
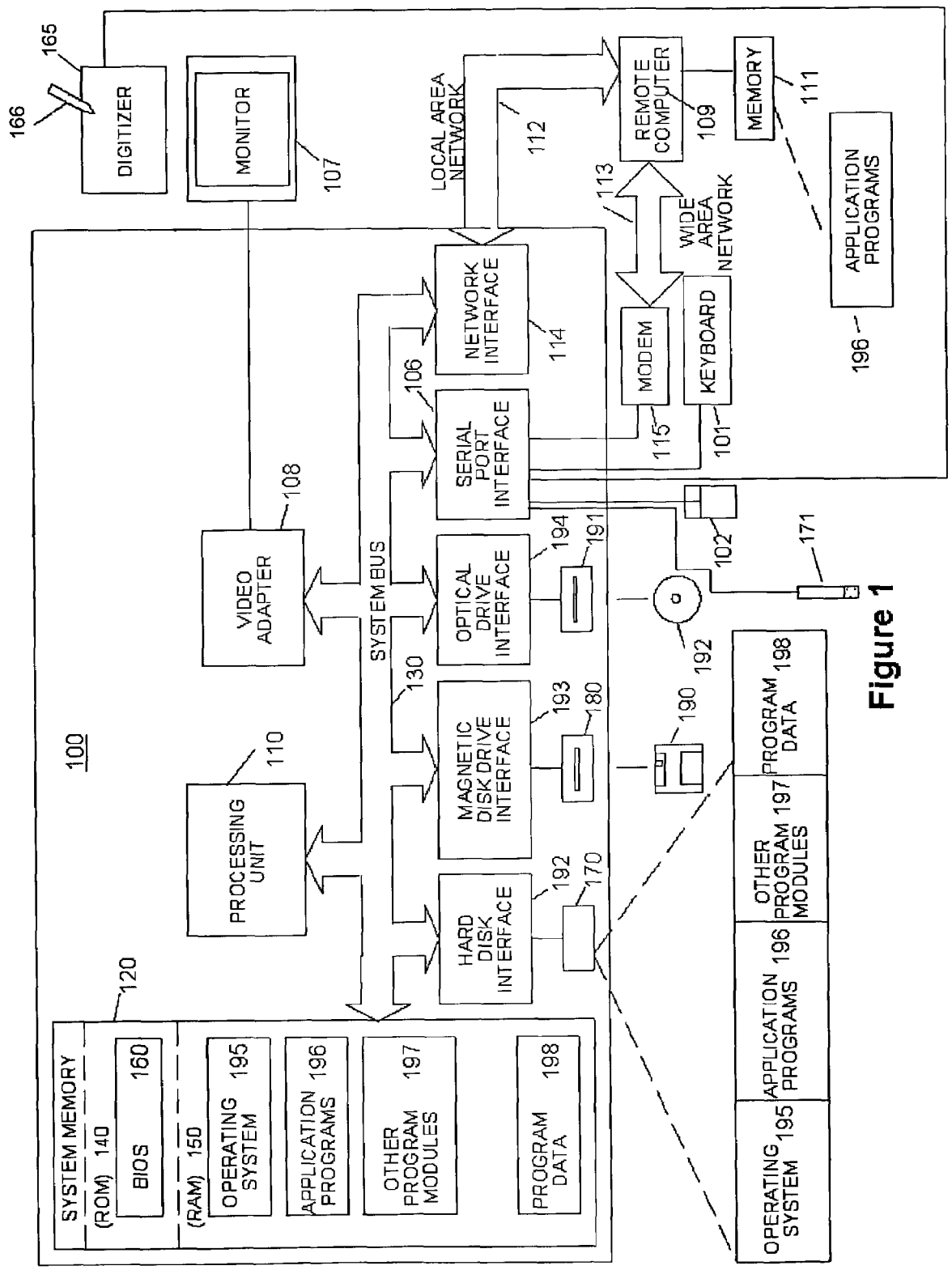
FIG. 1 shows a schematic diagram of a general-purpose digital computing environment that can be used to implement various aspects of the invention.

Aspects of the invention may be implemented with instructions that can be executed on a computing device. Accordingly, an exemplary computing environment for executing such instructions will be described. Aspects of the invention may be described in the general context of computer-executable instructions, such as program modules, executed by one or more computing devices. Generally, program modules include routines, programs, objects, components, data structures, etc. that perform particular tasks or implement particular abstract data types. Typically, the functionality of the program modules may be combined or distributed as desired. Because the invention may be implemented using software, it may be useful to briefly discuss the components and operation of a typical programmable computer on which various aspects of the invention may be employed. Such an exemplary computer system is illustrated in FIG. 1. The system includes a general-purpose computer 100. This computer 100 may take the form of a personal digital assistant; a tablet, desktop or laptop personal computer; a network server, or the like. Computer 100 typically includes at least some form of computer readable media. Computer readable media can be any available media that can be accessed by the computer 100. By way of example and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer 100 using appropriate hardware and interfaces. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150. A basic input/output system 160 (BIOS), containing the basic routines that help to transfer information between elements within the computer 100, such as during start-up, may be stored in the ROM 140. The computer 100 may also include any or all of a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM, DVD or other optical media. The hard disk drive 170, magnetic disk drive 180, and optical disk drive 191 may be connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the computer 100. It will be appreciated by those skilled in the art that other types of computer readable media that can store data that is accessible by a computer, such as magnetic cassettes, flash memory cards, digital video disks, Bernoulli cartridges, random access memories (RAM s), read only memories (ROMs), and the like, may also be used in the example operating environment. Also, it should be appreciated that more portable embodiments of the computer 100, such as a tablet personal computer or personal digital assistant, may omit one or more of the computer storage media devices discussed above.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices may include a microphone 171, joystick (not shown), game pad (not shown), satellite dish (not shown), scanner (not shown) or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, computers may include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 may also operate in a networked environment using logical connections to one or more remote computers, such as a remote computer 109. The remote computer 109 can be a server, a router, a network PC, a peer device or other common network node, and may include many or all of the elements described above relative to the computer 100, although only a memory storage device 111 has been illustrated in FIG. 1. The possible logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 may be connected to the local network 112 through a network interface or adapter 114. When used in a WAN networking environment, the computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers can be used to display and manipulate data on web pages.

Figure 2:
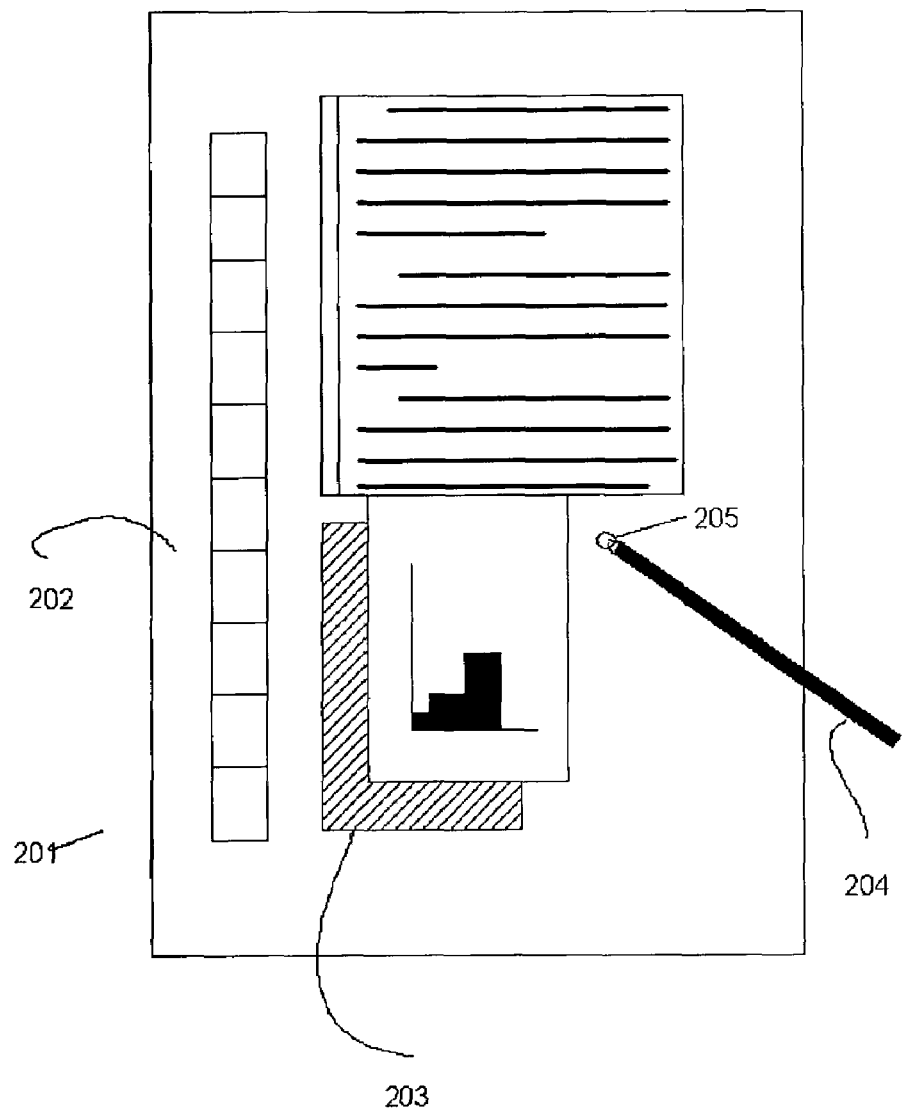
FIG. 2 shows a plan view of a tablet computer and stylus that can be used in accordance with various aspects of the present invention.

FIG. 2 illustrates an exemplary tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 may be displayed. Using stylus 204, a user can select, highlight, and/or write on the digitizing display surface 202. Examples of suitable digitizing display surfaces 202 include electromagnetic pen digitizers (such as, e.g., pen digitizers available from Wacom Technology Corporation of Vancouver, Wash.). Other types of pen digitizers, e.g., optical digitizers, may also be used. Tablet PC 201 interprets gestures made using stylus 204 in order to manipulate data, enter text, create drawings, enter system commands and/or execute conventional computer application tasks such as spreadsheets, word processing programs, and the like.

The stylus 204 may be static, whereby pressure upon (or other physical contact with) the display screen or other digitizing surface is necessary to effect input. Stylus 204 may also be dynamic, with distance from and/or orientation with regard to the screen (or other digitizing surface) being detectable. This could facilitate, e.g., "hovering," whereby a cursor is located on the screen by holding the stylus over a location without actually touching the screen or other digitizing surface. Stylus 204 could also be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Stylus 204 may also have one or more buttons that correspond generally to "left-click," "right-click" or other buttons often found on a computer mouse, and/or which may be programmable by a user. Other types of input devices, such as a mouse, trackball, or even a keyboard, could also be used. Additionally, a user's own finger could be the stylus 204 and used for selecting or indicating portions of the displayed image on a touch-sensitive or proximity-sensitive display. The term "user input device", as used herein, is intended to have a broad definition and encompasses many variations on well-known input devices such as stylus 204. Region 205 shows a feedback region or contact region permitting the user to determine where the stylus 204 as contacted the display surface 202.

Correcting Text Associated with Ink or Speech

FIG. 3A is an example of electronic ink 301 in the form of handwritten notes. Ink 301 might be created by a user moving a stylus or other input device across a display screen in the same manner as the user would write with a conventional pen or pencil on paper, and constitutes a visual representation of the user's handwritten input. The user might create this ink as part of a particular application program that is configured to accept input by a stylus or similar device, and which is then able to generate corresponding ink. As another alternative, the electronic ink may be created in a separate program that accepts the handwritten input and transmits it to another application. For example, a user may wish to input text into an application that was not designed to accept or recognize handwritten input; another program may be able to accept handwritten input; recognize ink from that input as handwriting and generate recognition results (which may be text or another type of object) corresponding to the ink; and then transfer the recognition results to the target application. These non-exclusive alternatives are only provided by way of illustration, however. The methods, user interfaces and other aspects of the invention are applicable to correction of text associated with electronic ink regardless of the particular software or other program(s) in which that correction occurs.

Figure 13:
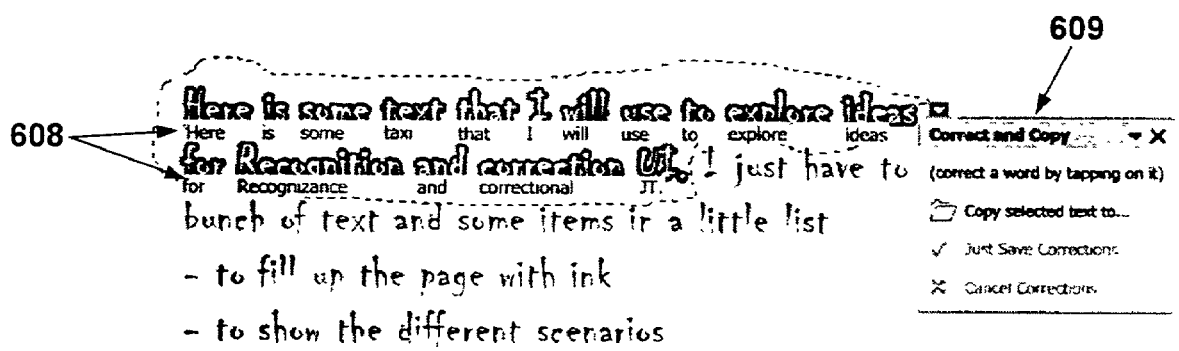

During or after creating the electronic ink (whether in the form of handwriting or otherwise), a user may wish to have one or more recognition processes performed upon the electronic ink. As the ink is recognized (whether a character at a time, a word at a time, or otherwise), text or other recognition results may be generated. Notably, the electronic ink and the recognition results may exist simultaneously. In other words, the electronic ink may not be replaced by the recognition results. Instead, the recognition results may exist as separate text, graphics or other object type that is associated with the ink, but that may be modified or replaced without changing the actual ink. Some software may perform recognition routines in the background. For example, as the user creates the electronic ink by writing with the stylus, text may be generated as the ink is created. Text or other recognition results may or may not be immediately displayed to the user. For example, a particular application may show a text recognition result as each ink word is written. As shown in FIG. 13, text may be displayed in reduced size near each ink word; text may be above, below, next to or overlying the original ink. Alternatively, the user may be required to perform a separate action to view a recognition result. For example, the user may be required to designate the ink in question to display a corresponding recognition result. Such designation could occur by electronically "highlighting" the ink (e.g., using the stylus as an electronic magic marker to color a screen region around the designated ink), by drawing an outline around the designated ink, or in other manners. After designation, the user may be required to hover over the designated ink, or enter a command (by, e.g., tapping an appropriate icon or making an appropriate gesture) to view the text or other recognition result. Other software may not perform recognition functions until specifically requested to do so. As one example, the software may require the user to designate some or all of the handwritten electronic ink to be recognized. Upon such designation, handwriting recognition routine(s) may be performed. These examples are non-exclusive.

Figure 4A:
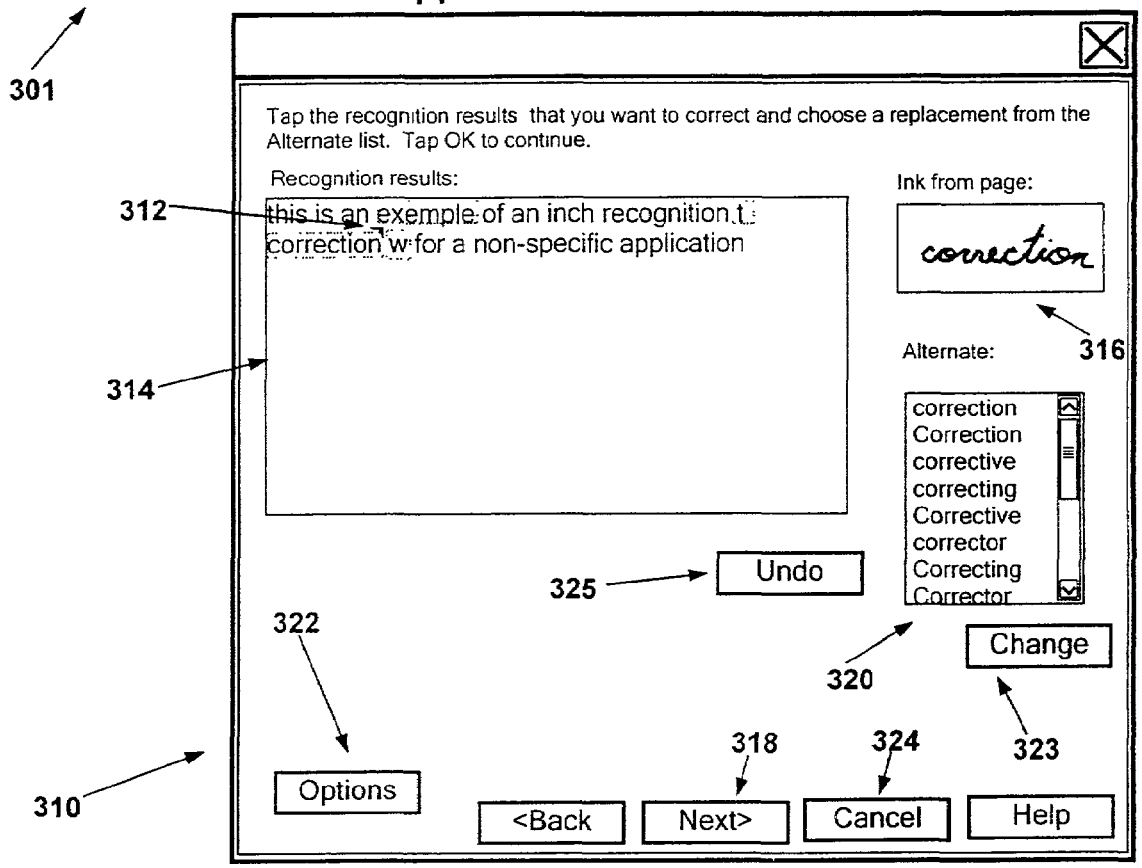
FIG. 4A is an example of a user interface for correcting text associated with electronic ink handwriting.

FIG. 3B is an example of a display of text 301' constituting a visual representation of speech recognition results for a user's spoken input. Although FIG. 3B shows text as the recognition results, such need not be the case. For example, a user could speak certain words (e.g., a file name) that generate a graphic or other type of object as a recognition result. Text 301' might be generated as part of a particular application program that is configured to accept voice input. As another alternative, text 301' may be generated in a separate program that accepts the voice input and "sends" it to another application. For example, a user may wish to input text into an application that was not designed to accept or recognize voice input; another program may be able to accept voice input, recognize the speech and convert it to text, and then transfer that text to the target application. These non-exclusive alternatives are only provided by way of illustration Regardless of when or how the electronic ink or speech is recognized, however, correction of the corresponding recognition results may be necessary. For example, the user may need to see text that has been generated and associated with the ink or speech (if not already displayed), and either accept or reject that text. The user may further need to choose alternative text, or provide alternative text if the recognition software is unable (or not configured) to provide an appropriate alternative selection. FIG. 4A shows one embodiment of a user interface (UI) by which the user may make corrections to some or all of text recognition results corresponding to ink 301. This user interface comprises a correction dialog 310. Correction dialog 310 may be initiated in various manners. For example, a user may select a correction widget as described in the U.S. application Ser. No. 10/145,425 (titled "Correction Widget," filed May 13, 2002). Dialog 310 could be initiated when a user designates some portion of displayed electronic ink and requests the correction dialog 310 by making an appropriate stylus gesture, pressing a stylus button, etc. Correction dialog 310 may include several regions in which information is displayed to the user. Region 314 displays text (or other type of recognition result) that the recognition process(es) has generated and that corresponds to the designated electronic ink. The user may then select text (or other recognition results) displayed in region 314 for correction. A selection indicator such as marker 312, or other suitable visual indicator, could be provided to indicate which text (or other recognition result) displayed within region 314 has been selected for correction, review, or other action (as described below). Some or all of the text within region 314 may be set apart from other text in region 314. As one example, and as shown in FIG. 4A, dashed lines or other box type could be rendered around the text. As other examples, the text could be enclosed in a colored region similar to a highlighted word on a printed page, underlined, placed in bold type, or otherwise set apart. As shown in FIG. 4A, the displayed text may include text for more than one electronic ink word. If, as shown in FIG. 4A, the user only designated the single electronic ink word "correction" (or more accurately, only designated ink intended to represent the word correction), correction dialog 310 may also display recognition results corresponding to ink that precedes the designated ink and/or corresponding to ink that follows the designated ink. In this manner, the user is provided with context information to assist in determining whether the selected recognition result is correct. Of course, if the user designates ink having multiple text words as part of the recognition results, display of those multiple words may provide sufficient contextual information. By providing additional context information within correction dialog 310, the user may avoid having to look away from (or to move, minimize or otherwise adjust) the dialog if it obscures the ink 301.

Correction dialog 310 also may include a region 320 that provides alternate recognition results (which may or may not be text). The user may choose one of the alternate recognition results, which may then be substituted for the recognition result the user selected in region 314. In this manner, the ink corresponding to the selected recognition result may remain unchanged, but have a new recognition result associated with it. In the example of FIG. 4A, the word "correction" is selected within region 314, and region 320 displays alternate text choices. Upon dialog initiation, region 320 may initially display alternates for the text associated with the designated ink ("correction" in FIG. 4A). If none of the alternates are correct, the user may further be able to specify what text should be associated with the ink. In the example of FIG. 4A, the user might select the Options button 322, and then be presented with another interface that provides the user with the ability to more neatly write the desired word with the stylus; to input the desired word via a "soft" keyboard (e.g., an image of a keyboard wherein the user can "type" by selecting images of letters with a stylus); or other input opportunities. For example, a Text Input Panel (TIP) as described in U.S. application Ser. No. 09/795,984 (filed Feb. 28, 2002 and titled "System and Method for Accepting Disparate Types of Input) could be implemented. The user may also be given the opportunity to add a word to the internal dictionary from which the alternates are provided.

Figure 4B:
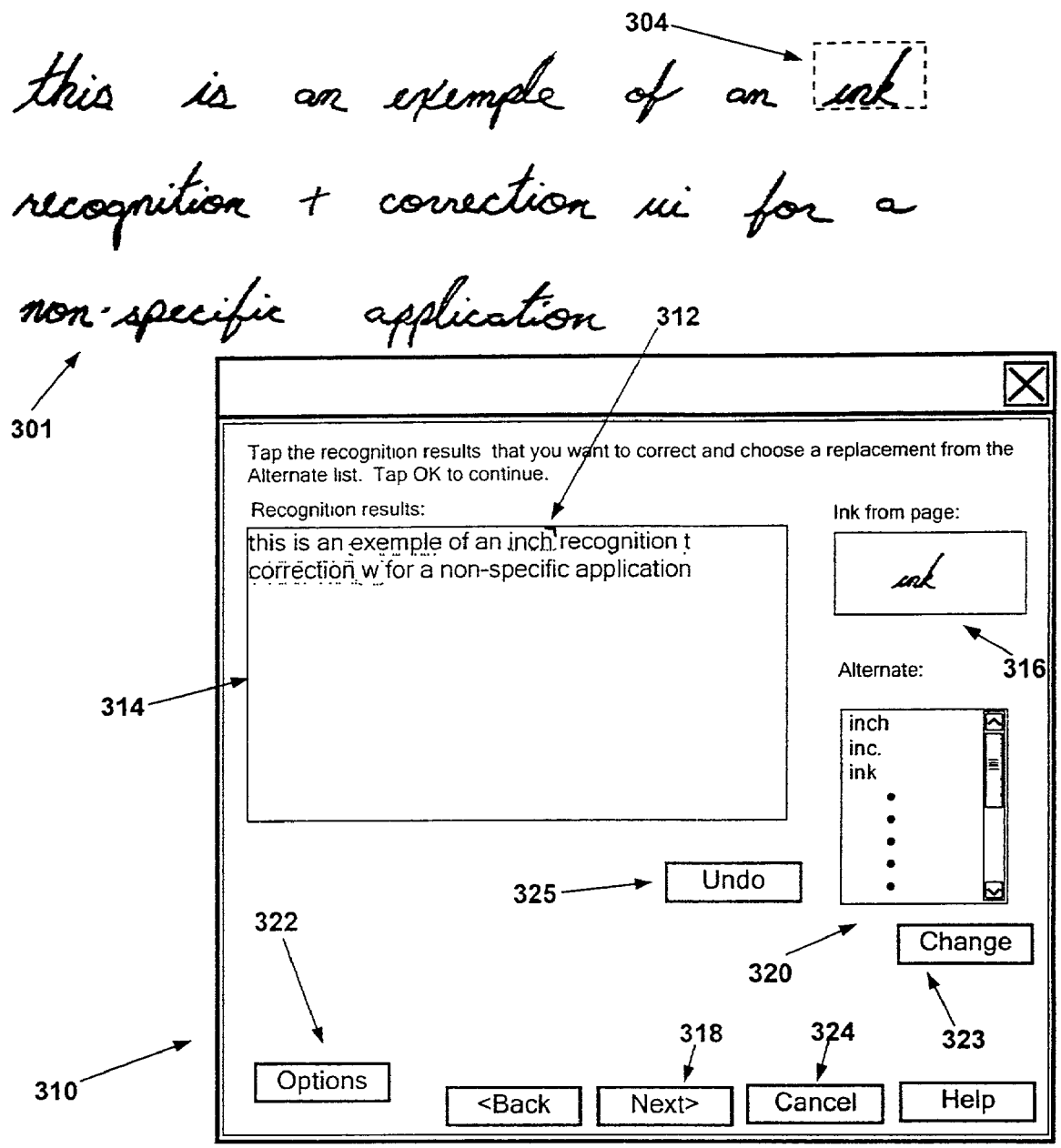
FIG. 4B shows the user interface of FIG. 4A with different text selected.

If one of the text alternates within region 320 is correct, however, the user could choose that text with, e.g., an appropriate pen gesture and then tapping the "change" button 323. In the example of FIG. 4A, the chosen alternate text would then replace the originally selected recognition result, but the ink itself would not be modified. The alternate text recognition result may replace the initial text recognition result; may be appended to the original text recognition result; may replace the original text recognition result with the original text maintained so as to be recoverable (by, e.g., pressing "undo" button 325); etc. Moreover, the recognition routine(s) could further be modified, using programming techniques known in the art, to associate the selected alternate with future occurrences of ink that is sufficiently similar to the ink for which the text association has been modified. Correction dialog 310 could also be combined with a spell checking option, a grammar checking option, or other correction devices. Referring again to FIG. 4A, the user misspelled the word "example" as "exemple". In region 314 of correction dialog 310, the user's handwritten ink has been correctly recognized, i.e., each character has been correctly identified as written. However, the appropriate software has also determined that this string of characters does not correspond to any word within the dictionary or other database relied upon by the spell-checking routine(s). Accordingly, the program has highlighted this word as a likely candidate for correction. Upon selecting this word within region 314, and as shown in FIG. 4B, a new list of alternates can be displayed in region 320.

The user may be able to correct or modify any of the text displayed in region 314. For example, the user may determine that the recognition results for the designated ink are correct, but determine that other text in region 314 should be corrected. Referring to FIGS. 4A and 4B, the user may have initiated correction dialog 310 by designating the ink word "correction" (shown by highlighting 304). Upon noticing that "ink" had been incorrectly interpreted as "inch", the user could select the incorrect text within region 314 (the word "inch") and choose (or otherwise provide) the correct text. As also shown in FIG. 4B, indicator 312 can show that other text has been selected, and the highlighting 304 could move to the corresponding ink. Similarly, if the user had simply changed his or her mind and wanted to write something else, the user could select the text association(s) at issue, and then provide new input via the Options button 322. The user might be able to "force" association of text that might not otherwise be associated with the ink at issue, or even replace segments of ink.

Correction dialog 310 may also include an auxiliary ink display region 316. Ink display region 316 may be used to display the electronic ink that corresponds to the text selected within region 314. If multiple ink "words" are designated, the ink display region 316 can be used to display particular ink corresponding to text currently selected in region 314. In this manner, the user is able to see the relevant ink if correction dialog 310 obscures the original designated ink lying outside correction dialog 310.

Figure 4C:
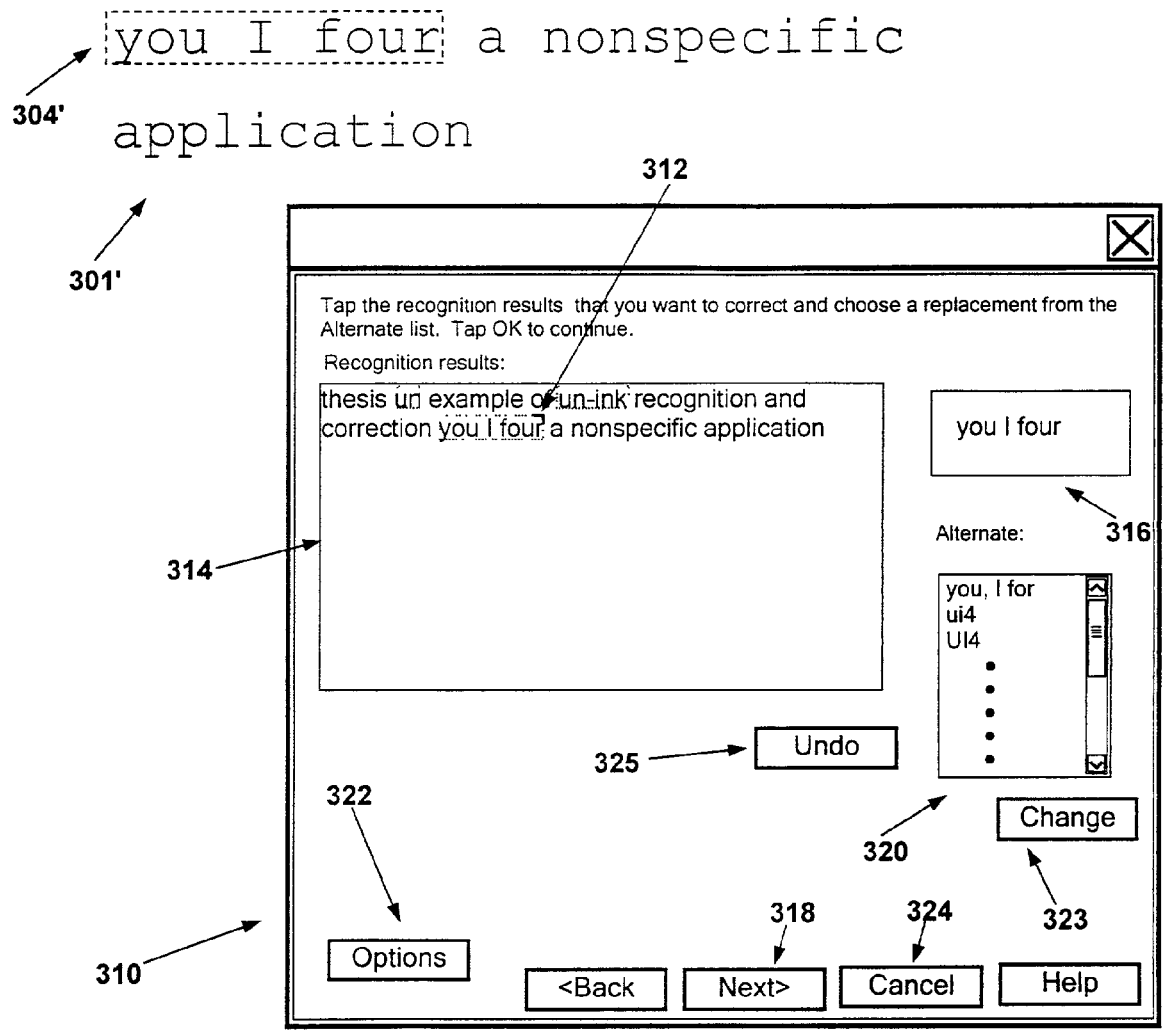
FIG. 4C is an example of a user interface for correcting text associated with user speech.
Figure 5A:
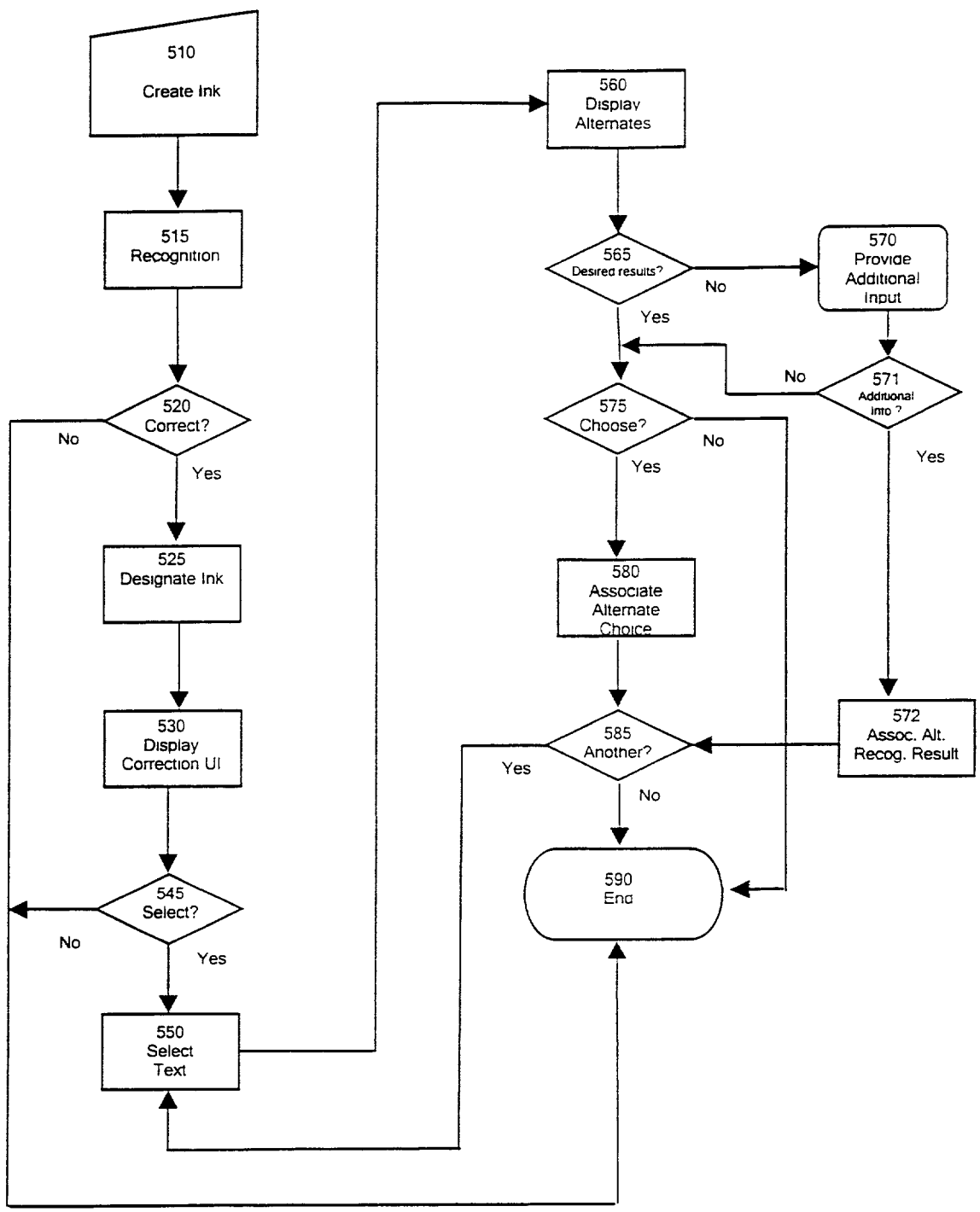
FIG. 5A is a flow chart showing operation of an aspect of the invention.

As shown in FIG. 4C, a substantially similar interface could be used for correction of speech recognition results. Text 301' visually represents the recognition results to the user. In a fashion similar to that described with regard to FIGS. 4A and 4B, the user can designate words for correction, such as by highlighting 304'. The user may then select text (or other recognition results) within region 314, choose alternates in region 320, and perform other operations similar to those described with regard to correcting ink recognition results. Alternatively, the recorded speech may be replayed and the user provided an opportunity to make corrections FIG. 5A is a flow chart showing an illustrative process for correcting recognition results for electronic ink; other processing could be used with aspects of the invention. At step 510, electronic ink is created. As set forth above, this can occur in various manners, and within various programs. At step 515, one or more recognition processes are performed upon the ink. As part of step 515, text or other recognition results are generated and associated with the ink. Again, this can occur in various manners as set forth above. As part of, or as an adjunct to, step 515, the associated recognition results are displayed or otherwise presented to a user. At step 520, the user determines whether correction of the recognition results are desired. This step could, but need not necessarily, involve a system prompt asking if such correction is desired. If no correction is desired, the process skips to step 590 and concludes. If, however, correction is desired, the appropriate ink is designated at 525. At step 530, recognition results for the designated ink are displayed to the user in an appropriate user interface (UI). The UI may, but need not be, similar to that shown in FIG. 4A. The interface may also display recognition results for additional ink that precedes and/or succeeds the designated ink. At step 545, a determination is made regarding whether any of the displayed recognition results will be modified. If no, the process skips to step 590 and concludes. If yes, the recognition result(s) to be modified is selected at step 550. Upon selection, additional recognition results may be displayed at step 560 as potential alternates. At step 565, a determination is made regarding whether any of the displayed alternate recognition results is desired. If no, the opportunity to provide additional information occurs at step 570. As part of step 570, the user may be able to input additional information via a soft keyboard, via additional ink gestures, or by other mechanisms. At step 571, a determination is made regarding whether the user provided additional information. If yes, a recognition result based on that information is associated with the corresponding ink at step 572, and the user is then able to select additional recognition results for correction (or reselect the corrected recognition results) at step 585. If the user did not provide additional input at step 570, the user is able to choose from the alternates provided at step 575.

If, at step 565, the desired alternate was presented, the user can then determine whether or not to choose that alternate. If chosen, the alternate is associated with the corresponding ink at step 580. If no alternate is chosen, the correction process could skip to step 590 and end. Using the UI of FIG. 4A as an example, the user could elect not to select an alternate, and simply press the "Cancel" button 324 to close the UI dialog. At step 585, the user is able to select other recognition results for correction (resulting in a loop to step 550). Otherwise, the correction process ends at step 590.

Figure 5B:
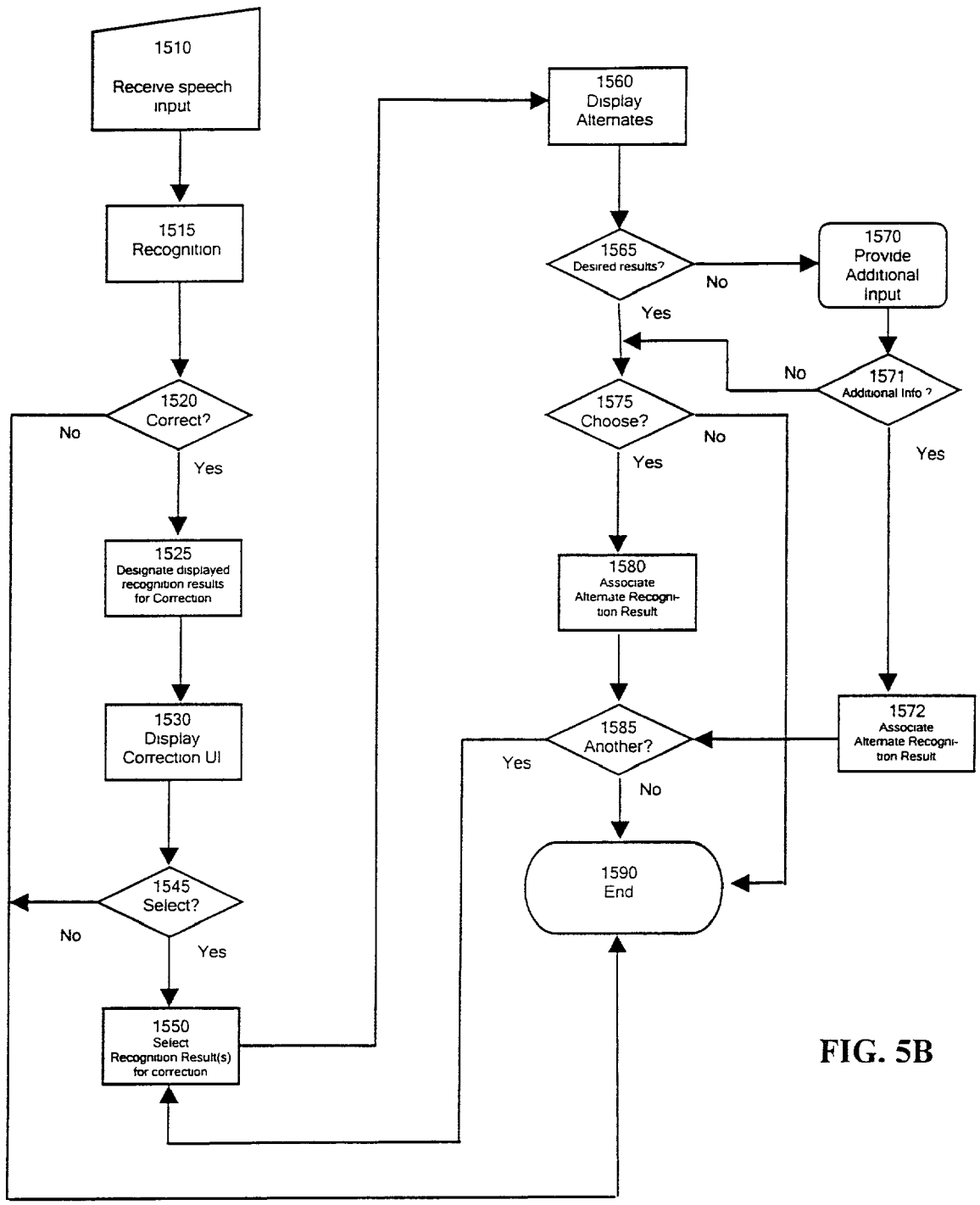
FIG. 5B is a flow chart showing operation of another aspect of the invention.

FIG. 5B is a flow chart, similar to FIG. 5A, showing an illustrative process for correcting speech recognition results. Other processing could be implemented. At step 1510, speech input is received. At step 1515, one or more recognition processes are performed upon the speech. As part of step 1515, text or other recognition results are generated. As part of, or as an adjunct to, step 1515, the recognition results are displayed or otherwise presented to a user. At step 1520, the user determines whether correction of the recognition results is desired. If no correction is desired, the process skips to step 1590 and concludes. If, however, correction is desired, an appropriate designation of the recognized speech occurs at 1525; this might include highlighting a displayed portion of text generated for a spoken passage. At step 1530, recognition results for the designated speech are displayed to the user in an appropriate user interface (UI). The UI may, but need not be, similar to that shown in FIG. 4C. The interface may also display recognition results for additional speech that precedes and/or succeeds the designated speech.

At step 1545, a determination is made regarding whether any of the displayed recognition results will be modified. If no, the process skips to step 1590 and concludes. If yes, the recognition result(s) to be modified is selected at step 1550. Upon selection, additional recognition results may be displayed at step 1560 as potential alternates. At step 1565, a determination is made regarding whether any of the displayed alternate recognition results is desired. If no, the opportunity to provide additional information occurs at step 1570. As part of step 1570, the user may be able to input additional information via a soft keyboard, via ink gestures, via additional speech, or by other mechanisms. At step 1571, a determination is made regarding whether the user provided additional information. If yes, a recognition result based on that information is associated with the corresponding speech at step 1572, and the user is then able to select additional recognition results for correction (or reselect the corrected recognition results) at step 1585. If the user did not provide additional input at step 1570, the user is able to choose from the alternates provided at step 1575. If, at step 1565, the desired alternate was presented, the user can then determine whether or not to choose that alternate. If chosen, the alternate is associated with the corresponding speech at step 1580. If no alternate is chosen, the correction process could skip to step 1590 and end. Using the UI of FIG. 4C as an example, the user could elect not to select an alternate, and simply press the "Cancel" button 324 to close the UI dialog. At step 1585, the user is able to select other recognition results for correction (resulting in a loop to step 1550). Otherwise, the correction process ends at step 1590.

Figure 6A:
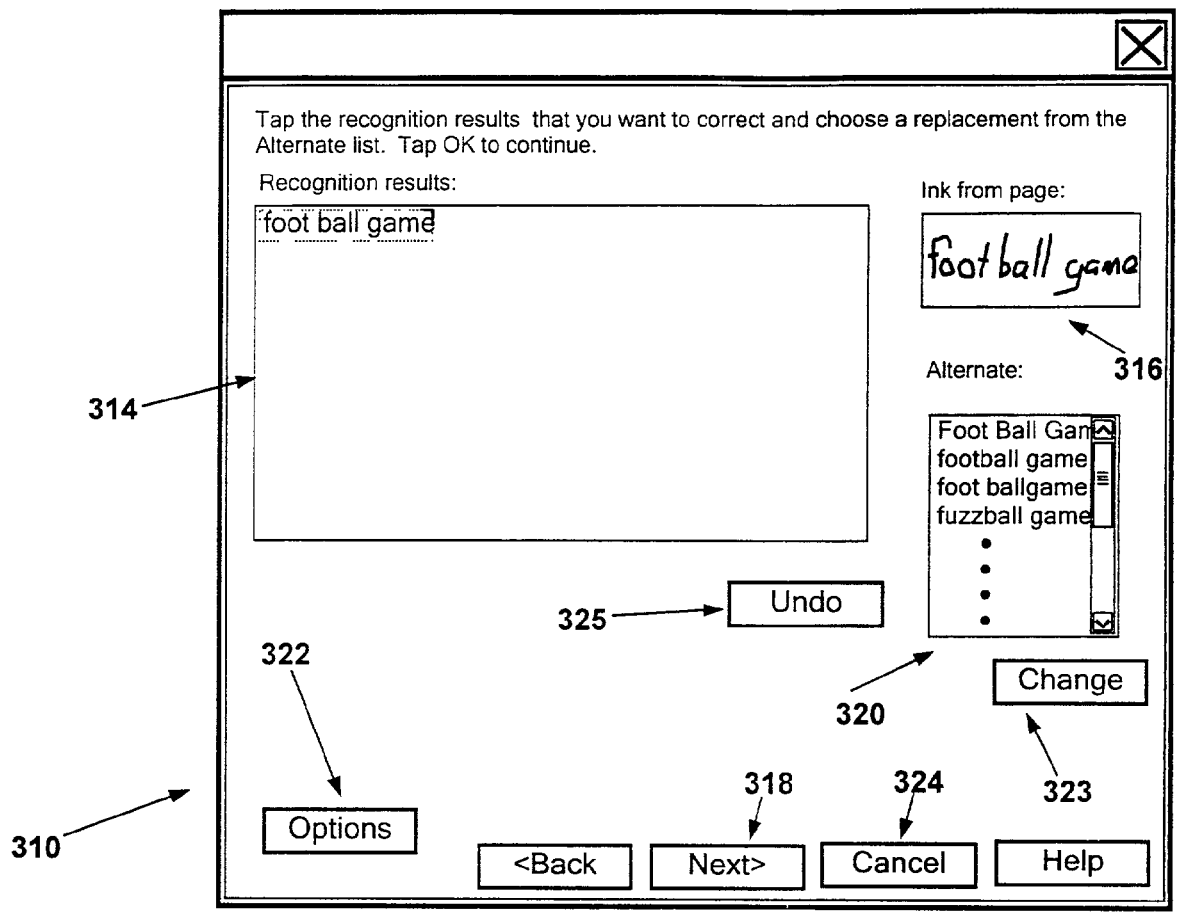
FIGS. 6A–6B show another example of a user interface for correcting text associated with electronic ink handwriting in accordance with aspects of the invention.
Figure 6B:
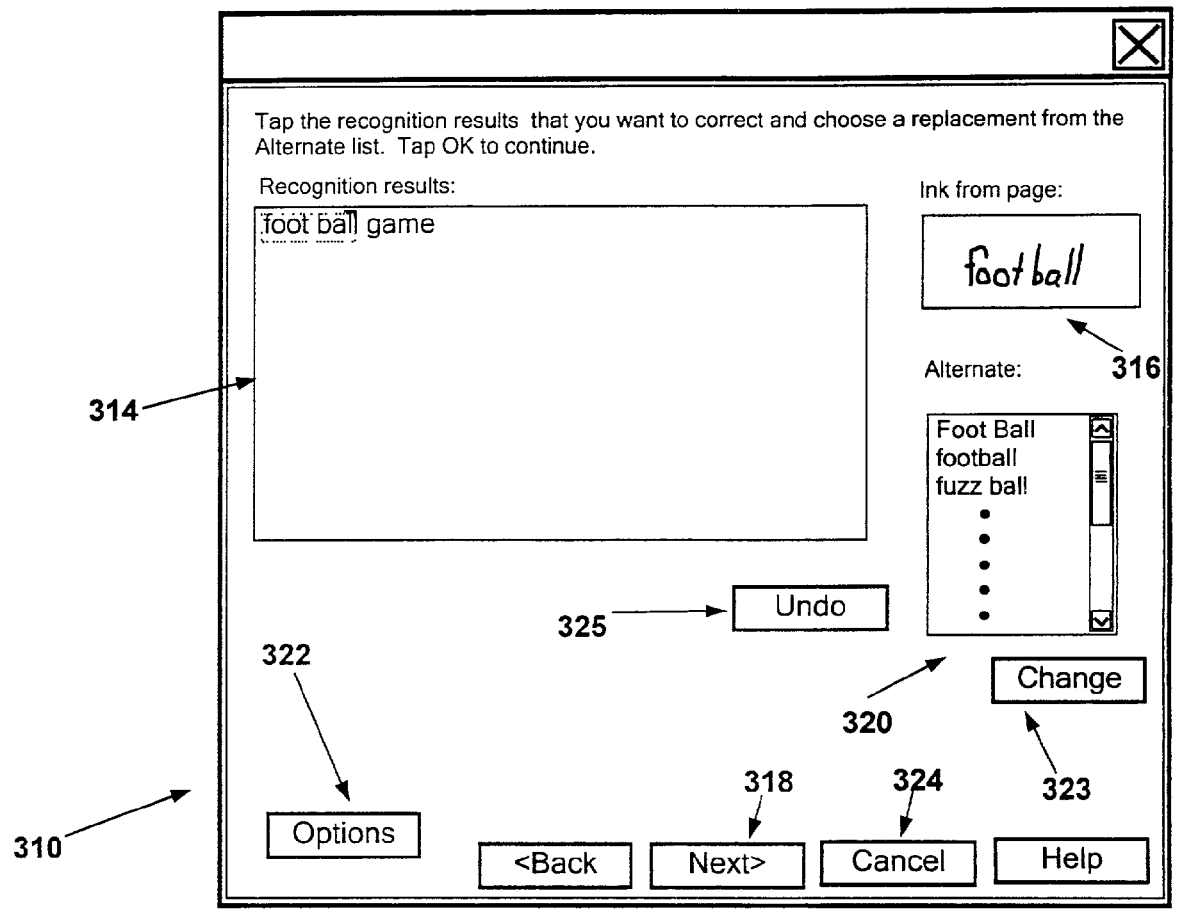

Correction dialog 310 might also be used to correct improper associations of fewer or more text words than intended. As shown in FIG. 6A, the user has attempted to write the phrase "football game" (2 words). However, that ink has instead been interpreted as "foot ball game" (3 words). As shown in FIGS. 6A and 6B, the user can correct this by selecting multiple words in region 314. If, upon selecting multiple text words, no appropriate alternate is offered in region 320, the user can proceed to input the correct text as discussed above (e.g., by use of a soft keyboard, by more neatly writing with the stylus, etc.). Similarly, if multiple ink "words" are incorrectly recognized as one text word (for example, "footballgame"), the associated text word can be highlighted, and a choice of alternates provided.

Figure 7A:
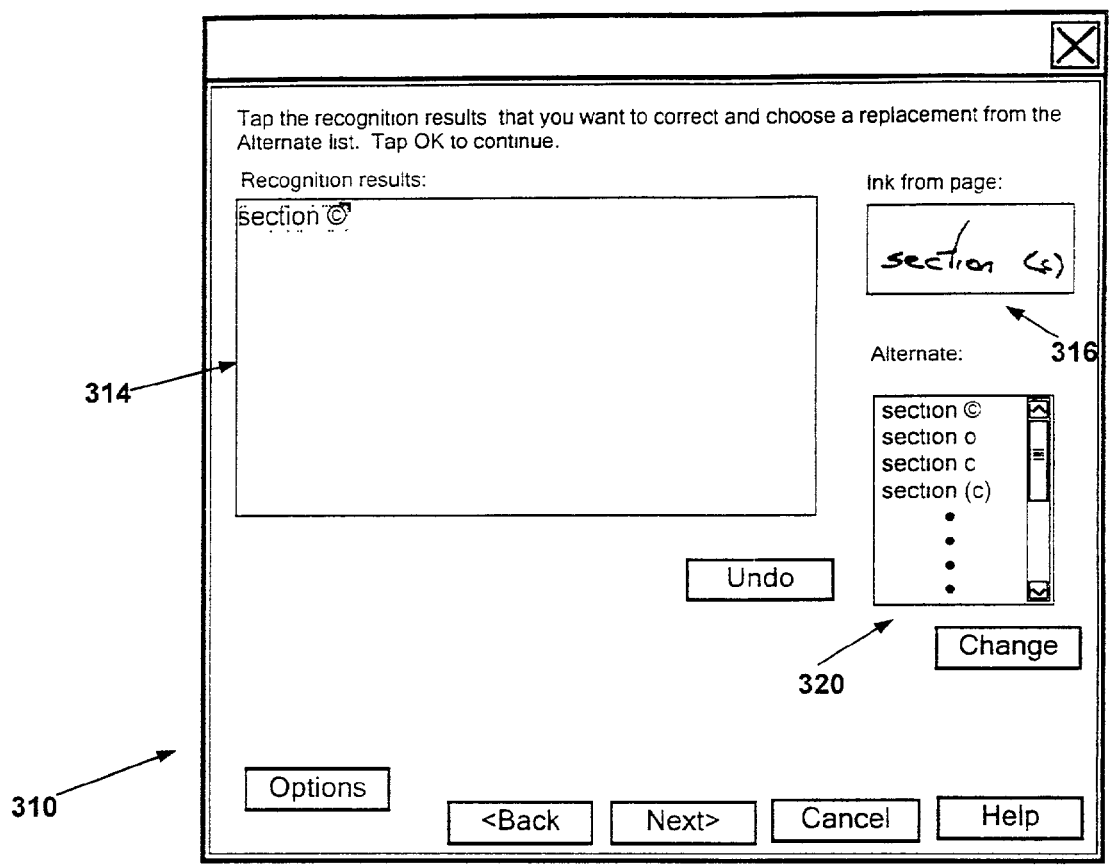
FIGS. 7A–7B show another example of a user interface for correcting text associated with electronic ink handwriting in accordance with aspects of the invention.
Figure 7B:
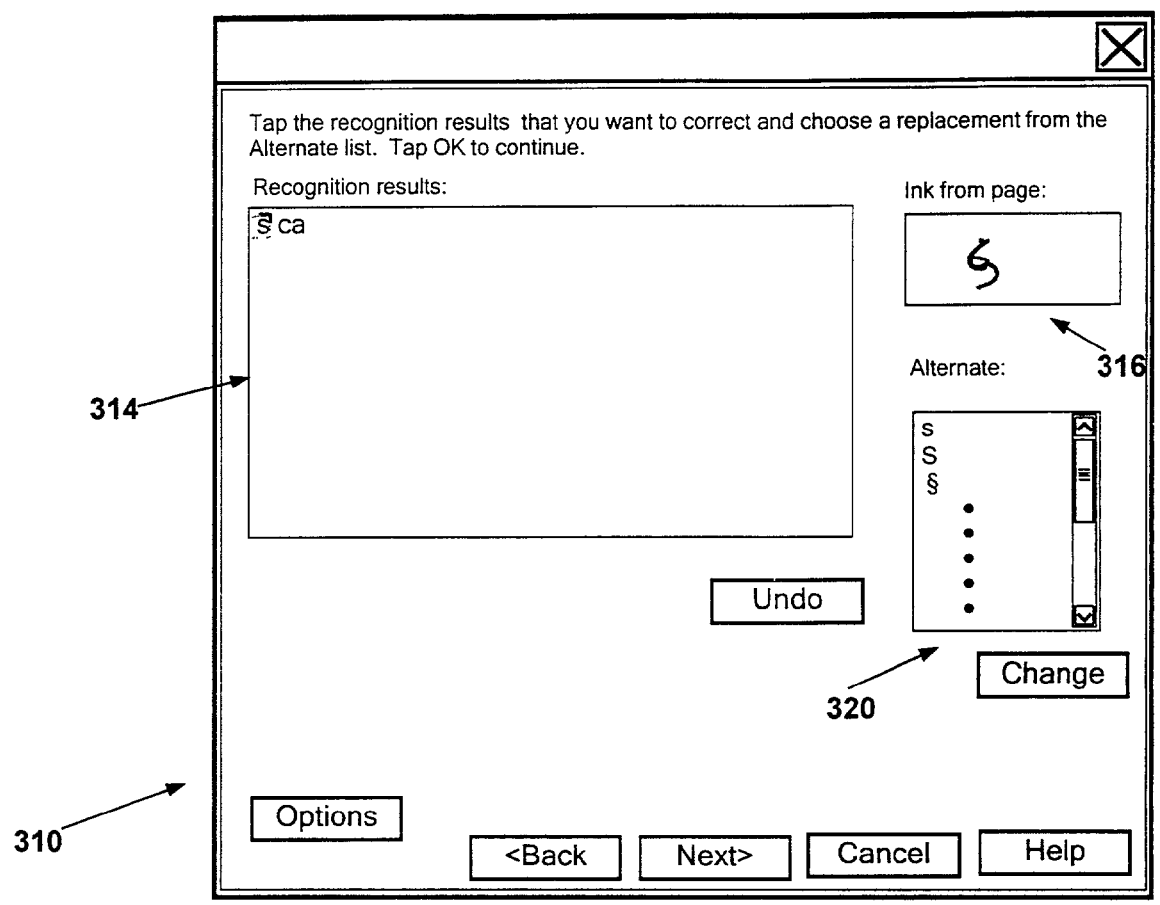

Aspects of the present invention further contemplate correction to (or from) non-word symbols. As shown in FIG. 7A, the user has attempted to write "section (c)" and "§ (c)". However, as shown in region 314, this ink has been interpreted as "section©" (FIG. 7A) and "sca" (FIG. 7B). The user might then be given letter alternates for non-letter characters (as shown in FIG. 7A) or vice versa (FIG. 7B).

Correcting Non-Text Objects

Figure 8A:
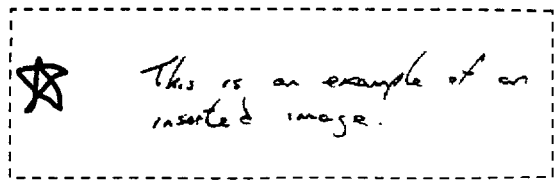
FIGS. 8A–8D show examples of a user interface for correcting non-text objects associated with electronic ink handwriting in accordance with aspects of the invention.
Figure 8A:
Figure 8A:
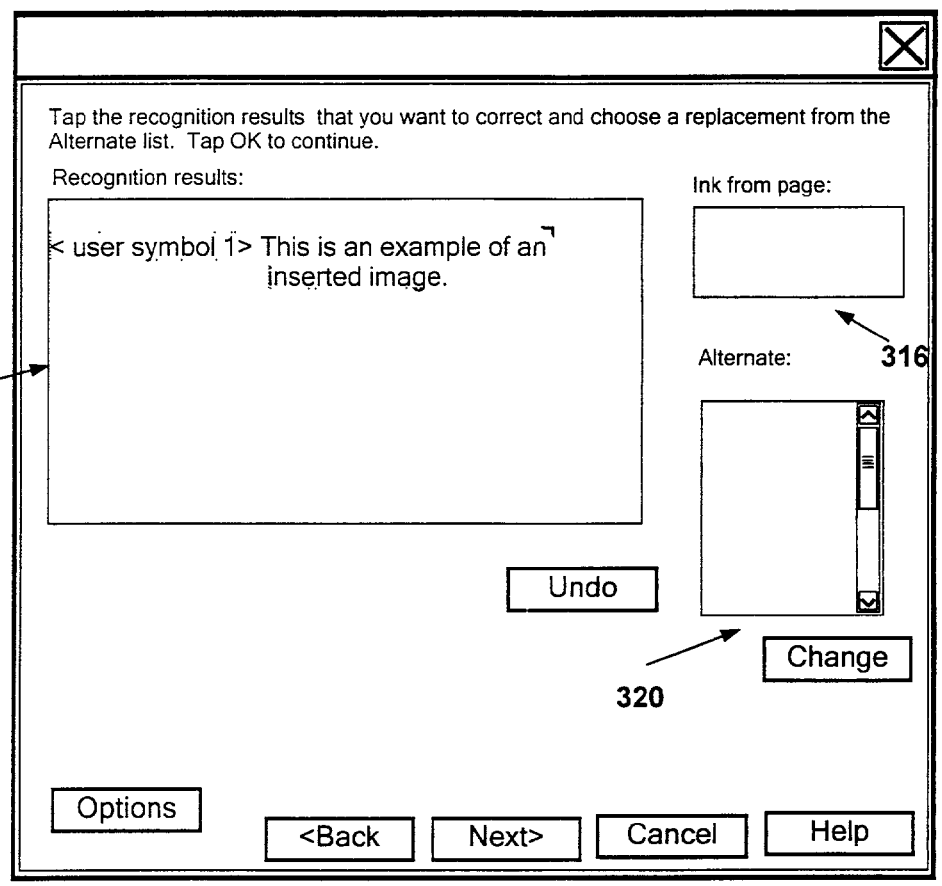
Figure 8B:
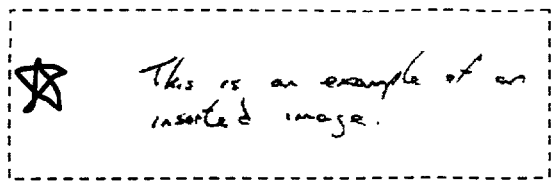
Figure 8B:
Figure 8B:
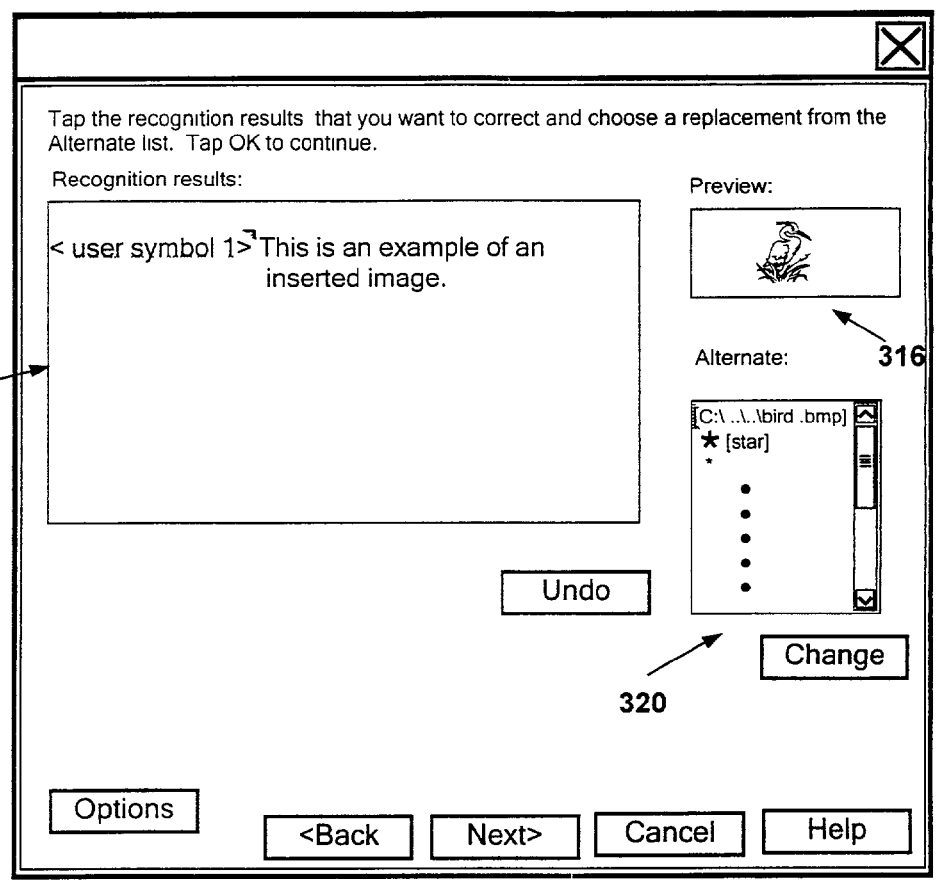
Figure 8C:
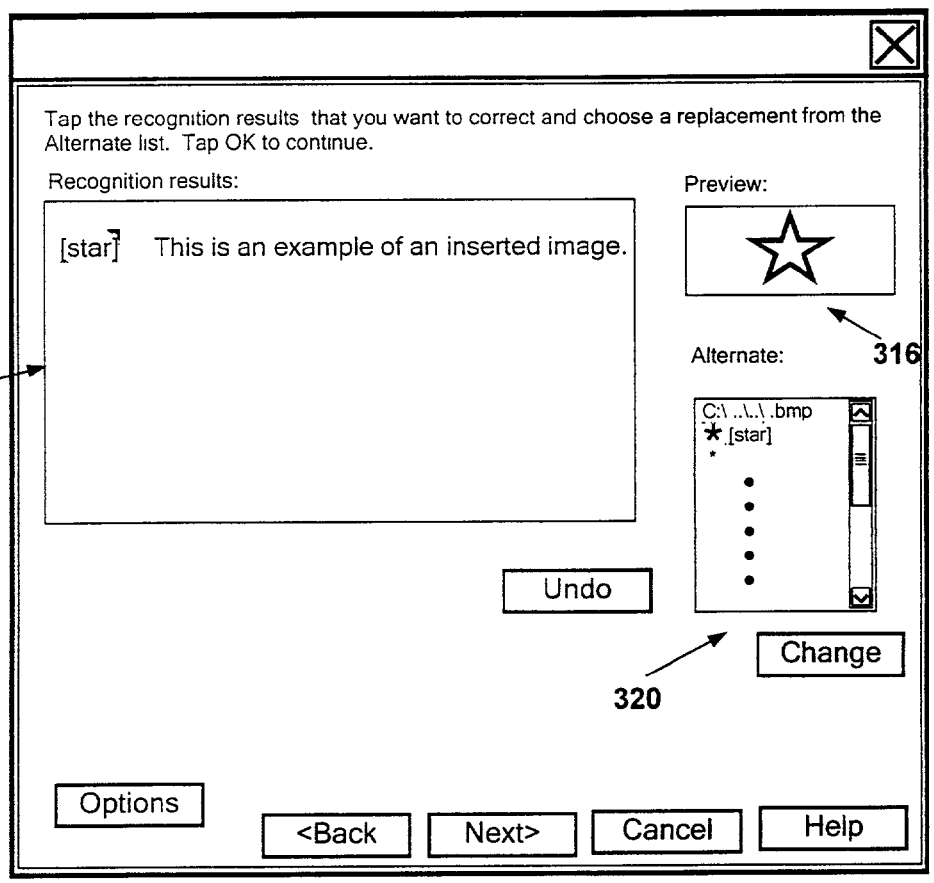
Figure 8D:
Figure 8D:
Figure 8D:
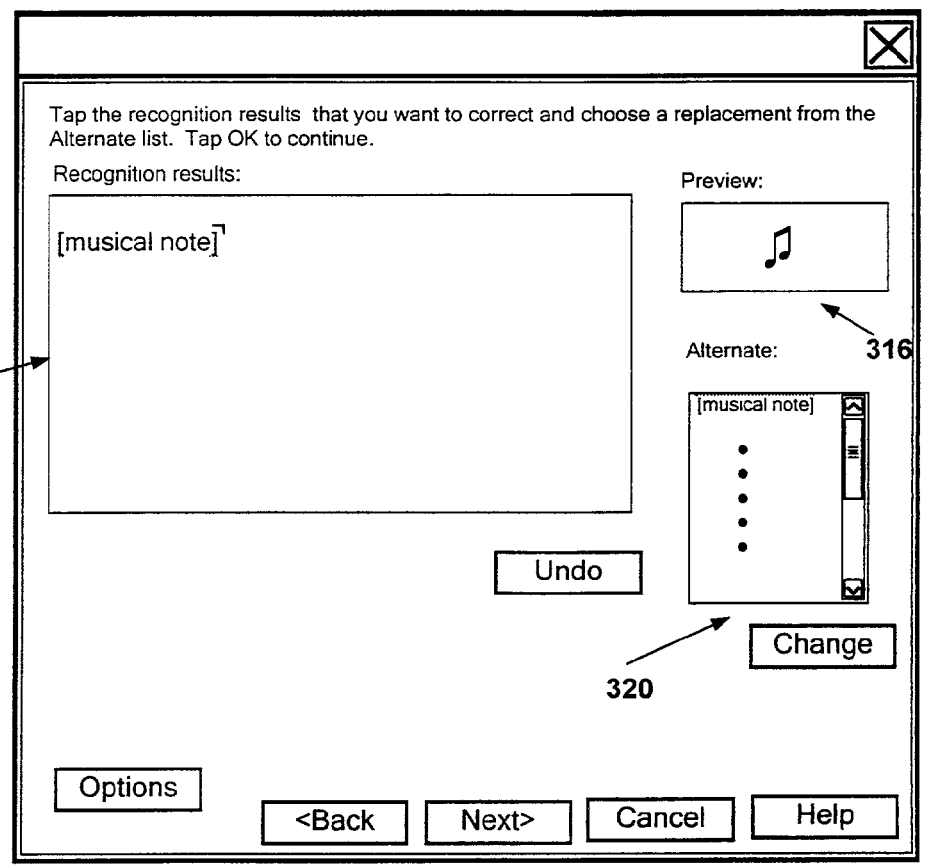
Figure 8E:
FIG. 8E shows an example of electronic ink converted into another form in accordance with aspects of the invention.
Figure 8E:

A user might also choose graphics or other non-text objects for association with, or substitution for, designated ink or a designated visual representation of speech. For example, the user may have previously created a graphical representation of the user's signature, and saved it as a special graphic object for, e.g., including at the end of e-mails, etc. As another example, the user may draw musical notes, chemical structures, or other material which could be recognized as a particular object, and a more clearly formed shape be substituted for the ink. Ink region 316 might be used for a "preview" of the potential alternate. This aspect of the invention might also allow a user to pre-configure a device to recognize certain user-defined symbols as an indication to automatically substitute a pre-chosen graphic, sound, video clip, chart, or other object. When the document is sent to another application or otherwise rendered, the desired object could be automatically placed into the text where desired. FIGS. 8A through 8E illustrate several examples of this aspect of the invention. As shown in FIG. 8A, the user has created ink consisting of several drawn symbols and some handwriting. Upon designating one of these symbols and the handwriting, the user is presented with dialog 310. As shown in region 314, the symbol has been recognized as a user defined symbol, and the handwriting recognized. FIG. 8B shows dialog 310 after the user selects "<user symbol 1>" in region 314. A path to an object associated with user symbol 1 is presented at the top of alternate region 320. In the example, the associated object is an image titled "bird.bmp". A preview of this image is provided in region 316, and the title of region 316 changed. FIG. 8C shows dialog 310 if the user instead chooses the second alternate in region 320. A "star" graphic is shown in the preview region 316. Similarly, when the user designates the second symbol drawn, it is recognized as a musical note, as shown in FIG. 8D. FIG. 8E shows a document that might result if the user accepted the associations of user symbol 1 and the musical note. If desired, the text associated with the handwriting could also be substituted for the handwriting ink.

Additional Aspects

In another aspect, a user may be able to indicate (explicitly or implicitly) the subject matter about which an ink or speech recognition result refers. In turn, this could cause a more specialized recognition process to be performed on the ink or speech recognition result. As but one example, an Internet universal resource locator (URL) has a specialized format that contains numerous character combinations not typically found in conventional written language. If a recognition engine is specifically searching for these combinations, they are less likely to be misidentified (e.g., "http://" as "httpill"). Indication of a specialized recognition subject matter could occur in numerous ways. For example, a user may be able to select a particular subject matter when (or before) the recognition process initially attempts to recognize the ink. Indication could also occur within (or as part of) the correction process.

One possible example of subject matter indication as part of correction is shown in FIGS. 9A and 9B. In this example, the user has written a mailing address, telephone number and e-mail address. The user then designates this ink and initiates the correction dialog as described above. Correction dialog 310' of FIG. 9A provides the user the additional option of specifying a destination to which the text within region 314' will be copied. Copy destination region 330 provides the user with several alternatives. Upon selecting a destination by tapping upon one of the destinations (or by other selection technique), a second and more specific pass at handwriting recognition may be possible. Specifically, by identifying a target for the text, the user can provide the recognition software with further clues about what information the text might contain. As shown in FIG. 9B, the user has specified that the text should be copied to an address book (or more accurately, to an application functioning as an address book). Upon doing so, additional recognition routines may be invoked that look for, e.g., ZIP codes, telephone numbers, e-mail addresses in the format of \_\_\_\_\_@\_\_\_\_\_.\_\_\_\_\_, etc. As shown in FIG. 9B, after specifying the copy destination, the recognition software is able to more closely identify the handwriting. The user can then make any additional desired or needed corrections, and once satisfied, press the "copy" button 340. This could then cause the text to be sent to the desired destination. Pressing copy button 340 could close the dialog 310', or an additional command may be needed. The user might also be able to select a destination in region 330, but then close dialog 310' without actually sending the text to another destination. In this manner, the user could still invoke a subject-specific recognizer, but not actually affect another program.

The illustrated example is but one of many possibilities. If the user had specified a list of web sites as the "copy to" destination, the recognizer could look for things like forward slashes, commonly-used domain extensions (e.g., ".com", ".net"), etc. If the user had specified a calendar, the recognizer might look for text in date or time format. If the user had specified a mathematical application program, the recognizer might look for mathematical symbols (e.g., $\int$, $\Delta$, $\sqrt{}$, $\infty$, $\neq$, etc.). If the user specified a copy destination that used a non-western language (e.g., Arabic, Hebrew, Chinese, Korean, Japanese, Russian, etc.), the recognizer might look for characters specific to the language in question. These examples are only illustrative, and not limiting. Moreover, invocation of a subject-specific recognition process could be combined with the embodiment described with regard to FIGS. 8A–8E. For example, a user could indicate an application for printing sheet music as a "copy to" destination. Upon doing so, the user's drawings of musical notes could be more accurately recognized (e.g., particular notes recognized), and more formalized graphics substituted for the hand-drawn notes.

Figure 9C:
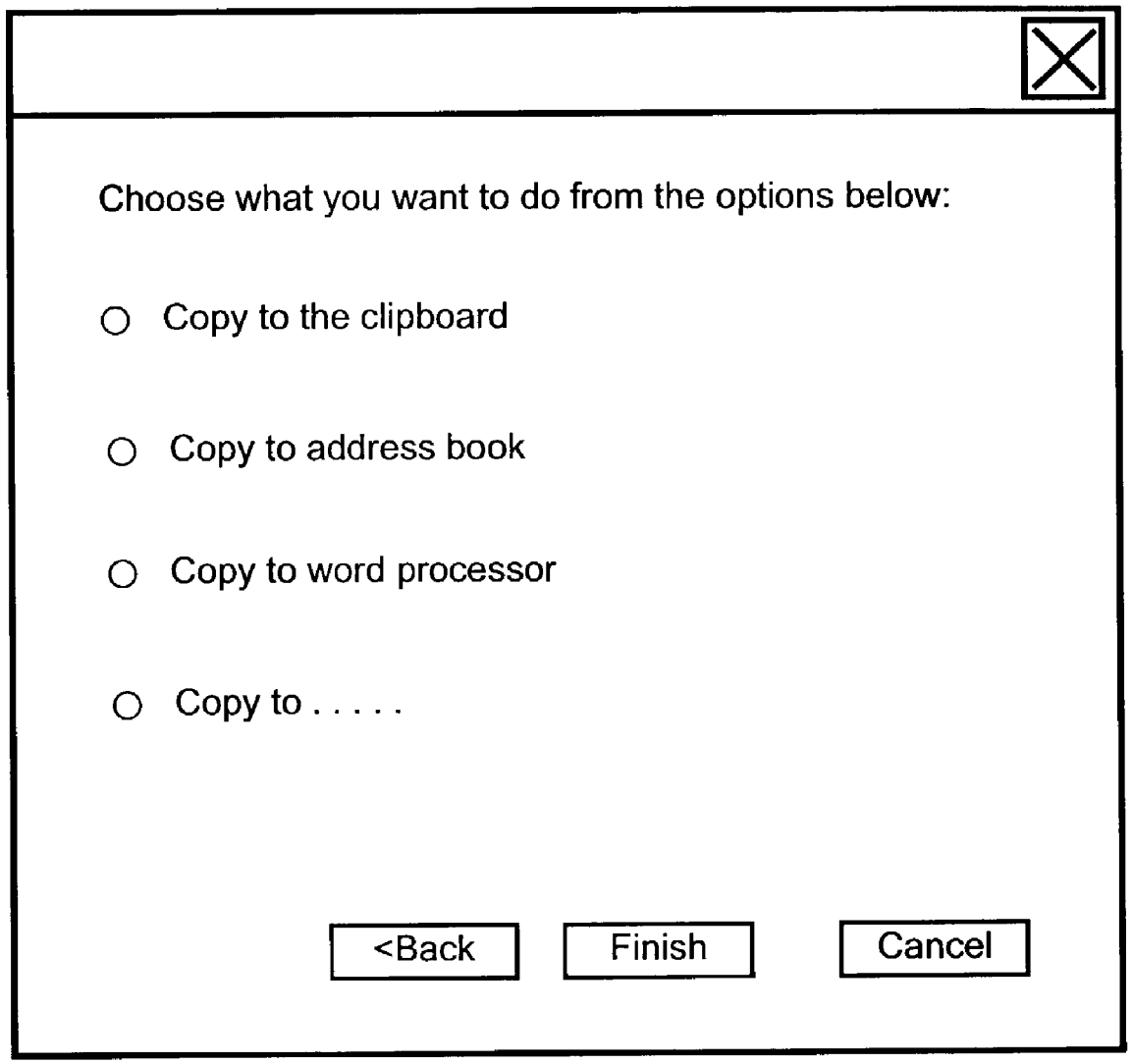
FIG. 9C shows an alternate user interface for indicating subject matter of recognition results.

FIG. 9C shows another possible user interface for indicating subject matter of the recognition result. Dialog 410 could be presented prior or subsequent to dialog 310; and could be presented to the user automatically (e.g., upon designating ink or speech to be corrected or upon closing a correction dialog), or the user could specifically invoke dialog 410 (e.g., by pressing an appropriate button that might be added dialog 310). As shown in FIG. 9C, dialog 410 offers the user a number of potential destinations. The user might also be provided the ability to provide additional information (via additional dialogs, drop down boxes, or other interfaces) to specify a destination.

Figure 10:
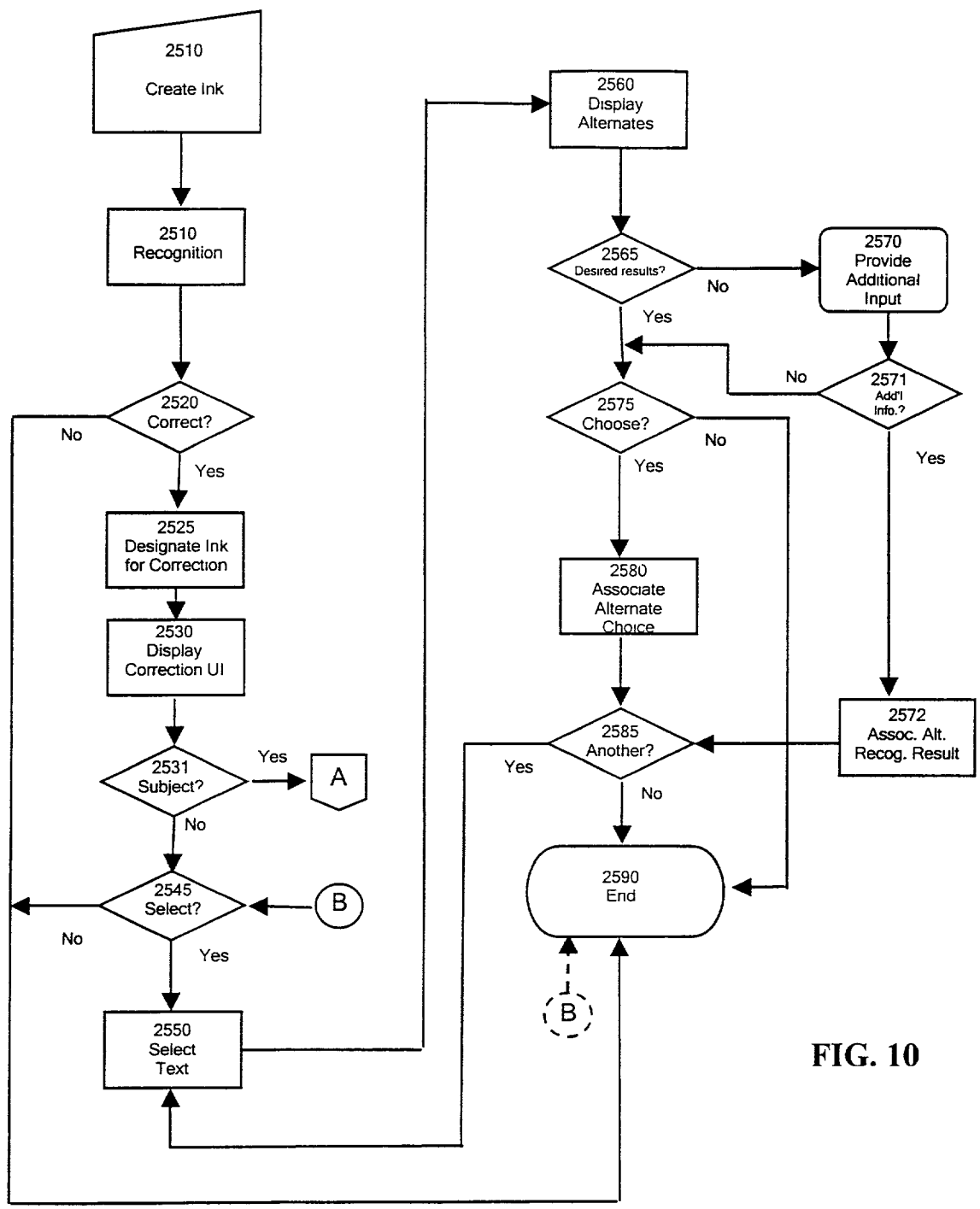
FIGS. 10–11 are flow charts showing operation of another aspect of the invention.
Figure 11:
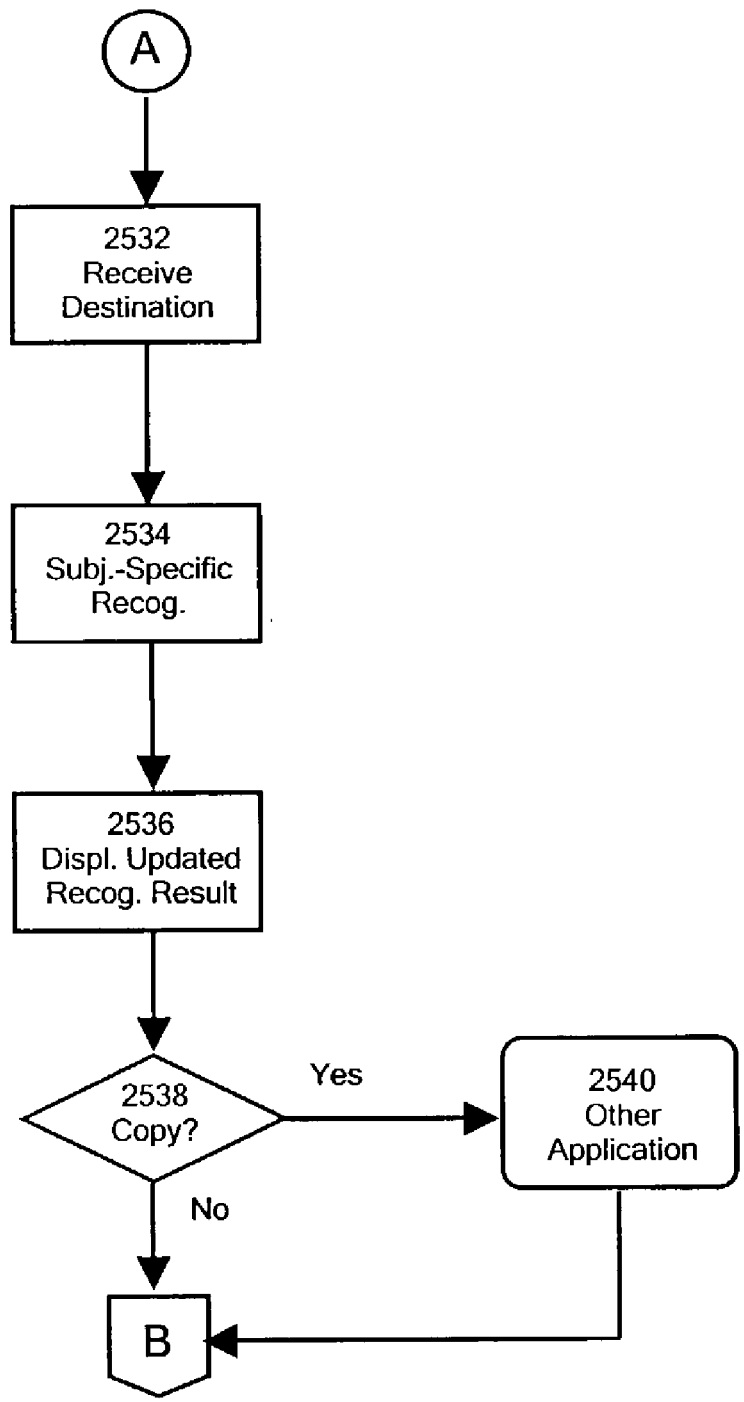

FIGS. 10 and 11 are flow charts for an illustrative process for correcting text associated with electronic ink, but including recognition processes specific to a particular subject matter. FIG. 10 is similar to FIG. 5. After step 2530, however, an additional decision step 2531 has been added, wherein a determination is made as to whether a recognition result(s) for the designated ink (previously displayed at step 2530) is to be subjected to recognition process(es) specific to a subject matter. This can, for example, include a decision to copy text to another destination, as described above. If yes, the process continues, via connector A, to the additional steps shown in FIG. 11. At step 2532 (FIG. 11), an indication of the destination for the recognition result(s) is received. Upon selection of a destination, additional recognition is performed on the selected recognition result(s) at step 2534, which additional recognition uses information about the subject matter to more accurately generate a recognition result(s) for association with the corresponding ink. The results of the additional recognition is displayed at step 2536 by updating the recognition result(s) previously displayed at step 2530. At step 2538, a determination can be made as to whether the updated recognition result(s) will be sent to the specified destination. If yes, transmission can occur at step 2540, after which the process returns to step 2545 via connector B. Alternatively, the correction process could simply terminate, as shown by the dashed connector B on FIG. 10.

If the recognition result(s) is not transmitted to a destination, the process continues directly from step 2538 to step 2545 (FIG. 10) via connector B. Such might occur if, for example, there are additional recognition result corrections to be made before transmitting the recognition result(s) to the target. Such could also occur if the user simply wanted to take advantage of the subject-specific recognition, but did not want to actually send information to another program.

Alternate Embodiment

Figure 12:
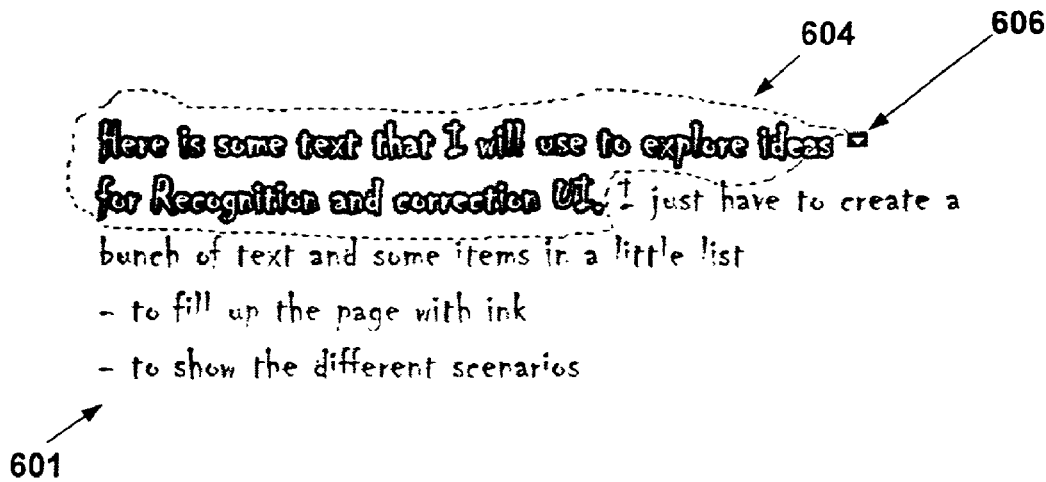
FIGS. 12–14 show a user interface of another aspect of the invention.
Figure 14:
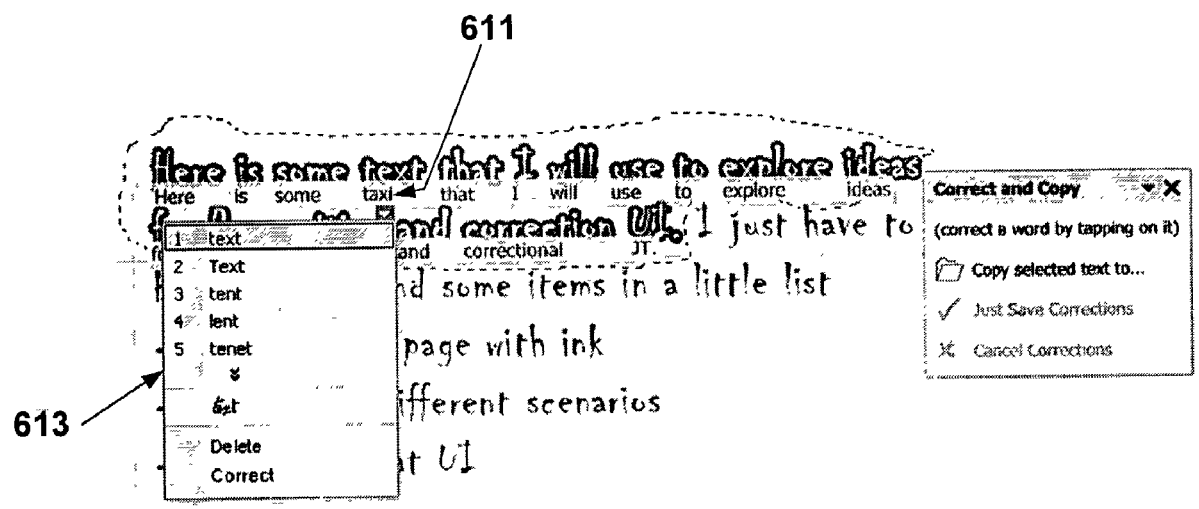

Another embodiment of the invention is shown in FIGS. 12–14. As shown in FIG. 12, the user has created electronic ink 601 in the form of handwriting; alternatively, the user could be presented with a display of speech recognition results. The user then designates section 604 by, e.g., drawing the dashed line around the handwriting with a stylus. As shown in FIGS. 12–14, the designated ink could be highlighted or otherwise displayed differently than non-designated ink. A correction "widget" 606 or other tag may appear below the rightmost pixel of the designated ink. Placement of such a tag could vary. As shown in FIG. 13, upon tapping or otherwise selecting widget 606, recognition results 608 are displayed on-object, e.g., in-place with the electronic ink and without obscuring the ink. Actual placement and display of the recognition results could vary. For example, text could be placed above the ink, displayed in a different color than the ink, displayed transparently or as a shadow, etc. Typically, text is displayed sufficiently smaller than ink such that the text can be placed interstitially without obscuring the ink. If the handwriting were more closely spaced together, however, the page could be "stretched" to provide room for the text so as not to obscure the ink.

Commands similar to those offered in the correction dialog embodiment can be offered in an on-object embodiment in the form of a "correct and copy" toolbar 609 (or other contextual menu). Preferably, such a toolbar or menu would appear as close as possible to tag 606 without obscuring the designated ink or corresponding text. As shown in FIG. 14, a user may correct components of the text associated with the designated ink. As seen in FIG. 14, ink 611 is intended by the user to represent the word "text". However, the recognition software has incorrectly interpreted the word as "taxi". By tapping on (or otherwise selecting) the text or ink for "taxi," a correction menu 613 may appear for that word. Preferably, menu 613 appears right or left justified based on the right- or left-handedness of the user. Similar to the region 320 shown in correction dialog 310 of FIG. 4A, correction menu 613 may offer alternate choices for the text (similar to the vertical dots in shown in other figures, the double chevrons indicate more alternate choices might be available). Correction menu 613 might also offer the user the chance to correct the text if no alternate is available. By tapping or otherwise selecting "correct" in correction menu 613, the user may be offered the ability to rewrite the word, to input the word with a soft keyboard, etc. Similar to the auxiliary ink display region 316, correction menu 613 may also display an image of the ink corresponding to the text under review.

A confidence level (i.e., a value associated with recognized text to determine if it has a high confidence of being a correct interpretation of the ink) for some or all of the text can also be used to create an interface to progress from one low confidence word to the next low-confidence word (or to the previous low-confidence word). A user might configure the system to automatically go to the next low-confidence word after correcting the current word. As shown in FIGS. 12–14, the various context menus can include instructional text (e.g. in parentheses). A "right-click" menu for selected text (via a button of a stylus, a particular stylus gesture, etc.) could also initiate correction menu 613 or toolbar 609. On tapping outside of a selection, toolbar or correction menu, the menus, tool bar and/or text could be hidden.

Functions previously illustrated in FIGS. 4A–11 could also be available in the embodiment of FIGS. 12–14. For example, spell checking, grammar checking, etc. could be incorporated into a correction menu. Similarly, correction of more words to fewer words, or vice versa, could be incorporated into correction menu 613. Non-letter characters and user-definable symbols could also be added. As indicated by the "copy selected text to . . . " in toolbar 609, a more specialized recognition engine could also be chosen or automatically used. Corrections made via correction menu 613 could also be used to teach the recognition engine or otherwise be carried forward in future text. Like the correction dialog of FIG. 4A, the embodiment of FIGS. 12–14 also allows a user to correct text associated with ink while having the benefit of preceding and succeeding contextual information. The embodiment shown in FIGS. 12–14 could also facilitate correction of non-text recognition results, as well as correction of speech recognition results.

Further Aspects

Figure 15A:
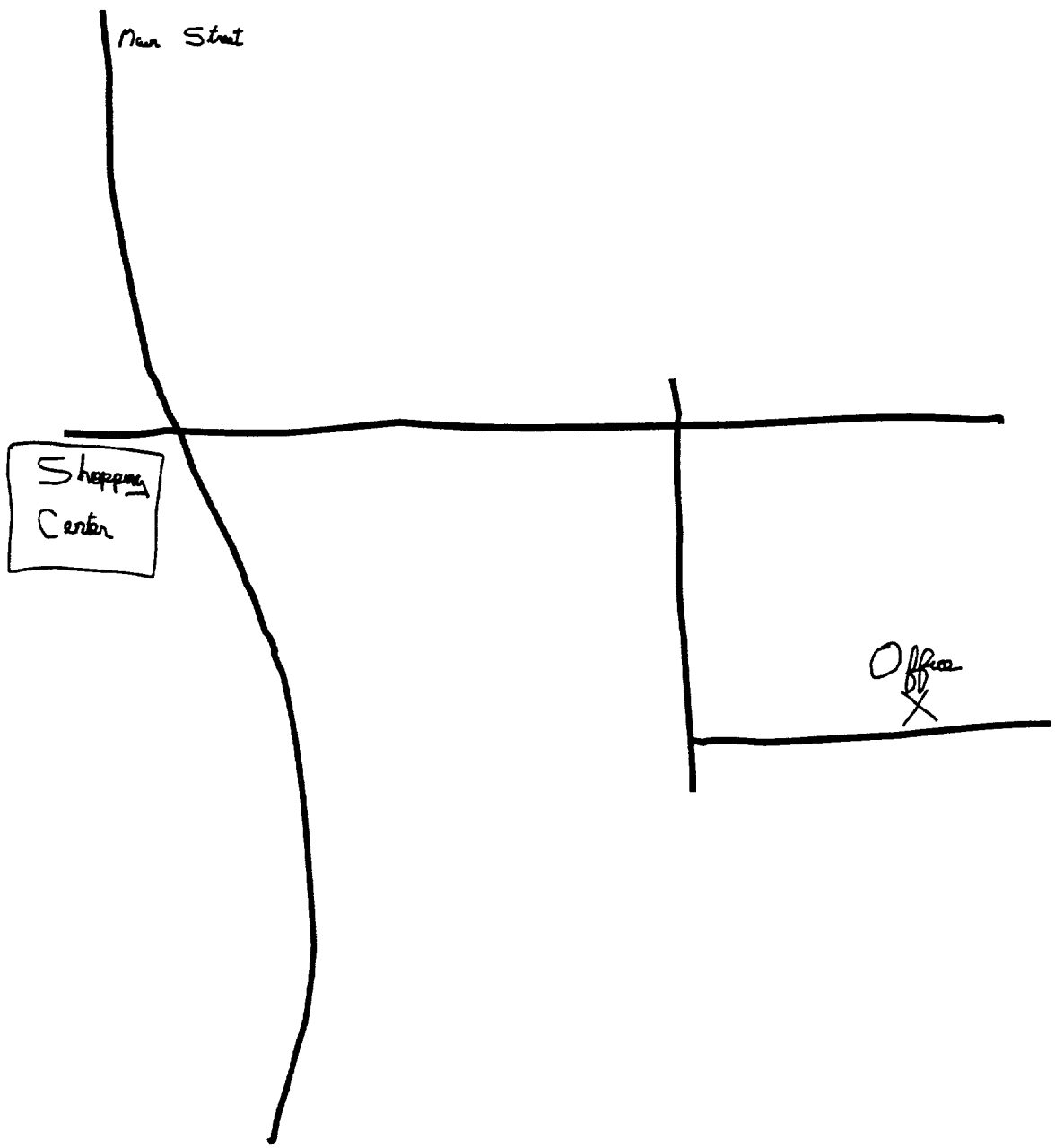
FIGS. 15A–15B show one possible use of electronic ink in accordance with aspects of the invention
Figure 15B:
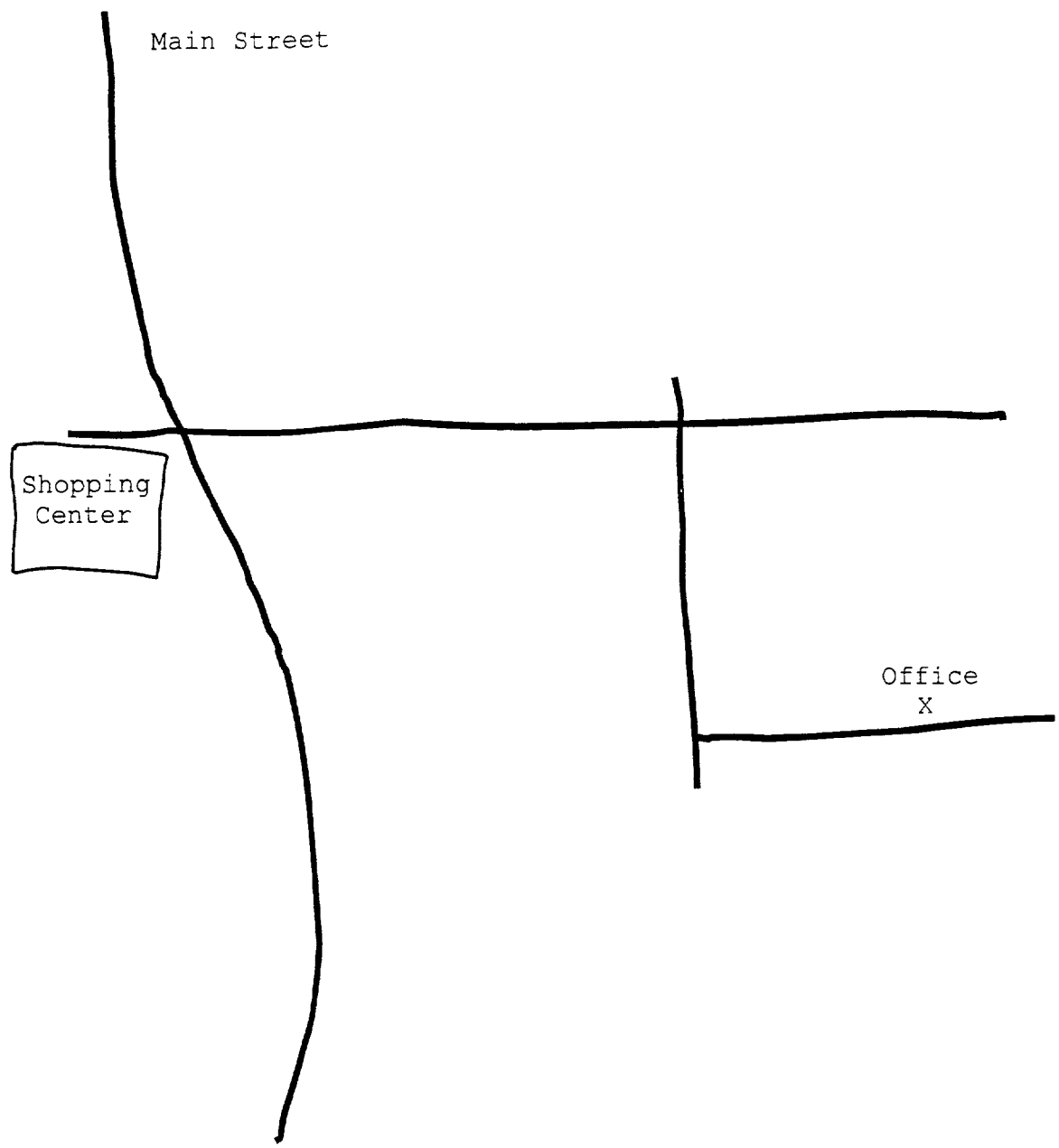

FIGS. 15A–15B illustrate one example of using the invention to replace ink with text that maintains position and scale with respect to nearby ink. In FIG. 15A, a user has sketched a map. The map includes various sketch lines to indicate roads and landmarks, as well as some handwriting. By designating the ink handwriting, the user can correct the associated text. Because text generally requires less space for display than handwriting, the user can then replace (substitute) the handwriting ink with the associated text, but maintain the same relationship to the other drawing figures (see FIG. 15B).

Aspects of the present invention can be combined with other, more conventional input devices such as a keyboard. Some tablet computers, for example, can be connected to a desktop station, or to a keyboard to form a laptop computer. A user may use the tablet to make handwritten notes, drawings, etc., and then later correct those notes using a mouse, keyboard, touchpad, etc. when the tablet is so connected.

Ink and corresponding recognition results can be saved as separate objects (or other data structures) in the same document. Alternatively, as shown in FIGS. 8E and 15B, certain ink can be replaced with text or non-text matter. Indeed, a user may completely replace ink with the corresponding text, effectively deleting the ink and creating a text document.

Conclusion

Although several examples of carrying out the invention have been described, those skilled in the art will appreciate that there are numerous variations and permutations of the above described methods, user interfaces and other aspects of the invention that fall within the spirit and scope of the invention as set forth in the appended claims. In addition to the alternatives and variations already discussed, further variations are possible and within the scope of the invention. For example, many of the steps in the flow charts of FIGS. 5, 10 and 11 can be rearranged and/or combined, and additional steps added. The regions, buttons and other features of the described dialog-based UI can also be rearranged, combined or otherwise modified, and/or additional features added. Similarly, the features of the on-object UI described above can be rearranged, combined or otherwise modified, and/or additional features added. Other types of user interfaces are also within the scope of the invention.

These and other modifications are within the scope of the invention, which is only to be limited by the attached claims.

The invention claimed is:

1. A method of correcting computer-generated recognition results corresponding to a visual representation on a display device of user input to a computer, the method comprising:

receiving a user designation of the visual representation presented on the display device;

performing a recognition process on the visual representation responsive to the user designation and generating one or more recognition results, the one or more recognition results being independent of the type of subject matter of the visual representation;

displaying the one or more recognition results corresponding to the designated visual representation;

receiving a user designation of a destination application, the destination application providing an indication of a type of subject matter of the visual representation;

performing a more specific recognition process, based upon the designated destination application which indicates the subject matter type of the visual representation and generating a revised recognition result; and displaying the revised recognition result.

2. The method of claim 1, further comprising:

receiving a selection of at least one recognition result from the displayed recognition results;

displaying alternate recognition results;

receiving a choice of an alternate recognition result; and modifying the selected recognition result based on the chosen alternate recognition result.

3. The method of claim 1, further includes transmitting the revised recognition result to the destination application.

4. In a computer system having a display device, a graphical user interface, and a user interface selection device, a method of correcting associations with electronic ink, comprising:

receiving a user designation of ink displayed on the display device;

performing first recognition process on the ink responsive to the user designation and generating one or more recognition results, the one or more recognition results being independent of the type of subject matter of the ink;

displaying a dialog on the display device, the dialog having an associated recognition region, and a destination region;

displaying the one or more recognition on results in the associated recognition region;

receiving a selection of a destination from the destination region;

in response to the received selection, performing a second more specific recognition process on the ink based upon the selected destination and generating a revised recognition result; and displaying the revised recognition result in the associated recognition region.

5. The method of claim 4, wherein the dialog further comprises an ink display region, and further comprising:

displaying in the ink display region an image of the designated ink.

6. The method of claim 4, further comprising:

transmitting the revised recognition result to the selected destination.

7. A computer readable medium having computer-executable instructions stored thereon for performing a method of correcting computer-generated recognition results corresponding to a visual representation on a display device of user input to a computer, the method comprising:

receiving a user designation of the visual representation presented on the display device;

performing a recognition process on the visual representation responsive to the user designation and generating one or more recognition results, the one or more recognition results being independent of the type of subject matter of the visual representation;

displaying the one or more recognition results corresponding to the designated visual representation;

receiving a user designation of a destination application, the destination application providing an indication of a type of subject matter of the visual representation;

performing a more specific recognition process based upon the designated destination application which indicates the subject matter type of the visual representation and generating a revised recognition result; and displaying the revised recognition result.

8. The computer readable medium of claim 7, wherein the method further includes transmitting the revised recognition result to the destination application.

* * * * *